United States Patent
Naoi et al.

(10) Patent No.: US 11,459,244 B2
(45) Date of Patent: Oct. 4, 2022

(54) PARTICLES OF β-IRON OXYHYDROXIDE-BASED COMPOUND, MANUFACTURING METHOD OF THE SAME, MANUFACTURING METHOD OF PARTICLES OF ε-IRON OXIDE-BASED COMPOUND, AND MANUFACTURING METHOD OF MAGNETIC RECORDING MEDIUM

(71) Applicant: FUJIFILM CORPORATION, Tokyo (JP)

(72) Inventors: Kenji Naoi, Kanagawa (JP); Takashi Fujimoto, Kanagawa (JP); Masashi Shirata, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 861 days.

(21) Appl. No.: 16/251,097

(22) Filed: Jan. 18, 2019

(65) Prior Publication Data

US 2019/0300380 A1    Oct. 3, 2019

(30) Foreign Application Priority Data

Mar. 29, 2018 (JP) .............................. JP2018-066008

(51) Int. Cl.
| | | |
|---|---|---|
| C01G 49/02 | (2006.01) | |
| H01F 1/11 | (2006.01) | |
| G11B 5/706 | (2006.01) | |

(52) U.S. Cl.
CPC .......... *C01G 49/02* (2013.01); *G11B 5/70626* (2013.01); *H01F 1/11* (2013.01); *C01P 2002/70* (2013.01); *C01P 2004/04* (2013.01); *C01P 2004/32* (2013.01); *C01P 2004/64* (2013.01); *C01P 2006/42* (2013.01)

(58) Field of Classification Search
CPC .................................................... C01G 49/02
See application file for complete search history.

(56) References Cited

U.S. PATENT DOCUMENTS

| 6,244,216 | B1 | 6/2001 | Ochi |
| 2008/0067469 | A1 | 3/2008 | Eyal et al. |
| 2010/0062283 | A1 | 3/2010 | Ohkoshi |
| 2017/0287516 | A1 | 10/2017 | Sakane et al. |
| 2018/0170767 | A1 | 6/2018 | Ohkoshi et al. |

FOREIGN PATENT DOCUMENTS

| CN | 103740365 A | 4/2014 |
| CN | 107635924 A | 1/2018 |
| JP | H03-109215 A | 5/1991 |
| JP | H05-170451 A | 7/1993 |
| JP | H08-27942 B2 | 3/1996 |
| JP | 2007-269548 A | 10/2007 |
| JP | 2008-504202 A | 2/2008 |
| JP | 2008-174405 A | 7/2008 |
| JP | 5966064 B1 | 8/2016 |
| JP | 5966064 B2 | 8/2016 |
| JP | 2017-1944 A | 1/2017 |
| WO | 2016/047559 A1 | 3/2016 |

OTHER PUBLICATIONS

Machine translation of JP2017001944 (Year: 2017).*
English language translation of the following: Notice of Opposition to Patent submitted on Sep. 17, 2021 to the JPO in a Japanese patent No. 6843793 corresponding to the instant patent application.
Marin Tadic et al., "Synthesis of metastable hard-magnetic ε-Fe$_2$O$_3$ nanoparticles from silica-coated akaganeite nanorods", Nonoscale, The Royal Society of Chemistry 2017, Sep. 2017, p. 10579-10584.
Sergio Lentijo Mozo et al., "Synthesizing Iron Oxide Nanostructures: The Polyethylenenemine (PEI) Role", Crystals, Biological and Environmental Sciences and Engineering (BESE) Division, Nanostructures & Biotech Laboratory (NABLA Lab), King Abdullah University of Science and Technology (KAUST), Thuwal, Saudi Arabia, Jul. 22, 2017, retrieved from https://www.mdpi.com/journal/crystals.
Reagent search retrieved from https://www.yone-yama.co.jp/shiyaku/search/shosai-03392.html, Yoneyama Yakuhin Kogyo Co., Ltd., 2012.
English language translation of the following: Office action dated Nov. 10, 2020 from the JPO in a Japanese patent application No. 2018-066008 corresponding to the instant patent application. This office action translation is submitted now in order to supplement the understanding of the cited references which are being disclosed in the instant Information Disclosure Statement.
English language translation of the following: Office action dated Jun. 24, 2022 from the SIPO in a Chinese patent application No. 201910154521.5 corresponding to the instant patent application. This office action translation is submitted now in order to supplement the understanding of the cited references which are being disclosed in the instant Information Disclosure Statement.

* cited by examiner

*Primary Examiner* — Alexandre F Ferre

(74) *Attorney, Agent, or Firm* — Solaris Intellectual Property Group, PLLC

(57) ABSTRACT

Disclosed are a particle of a β-iron oxyhydroxide-based compound represented by Formula (1), in which an average equivalent circle diameter of primary particles is 5 nm to 30 nm, and a coefficient of variation of equivalent circle diameters of the primary particles is 10% to 30% [In Formula (1), A represents at least one kind of metal element other than Fe, and a represents a number that satisfies a relationship of 0≤a<1.], and applications thereof.

$$\beta\text{-}A_a Fe_{1-a} OOH \qquad (1)$$

10 Claims, No Drawings

PARTICLES OF β-IRON OXYHYDROXIDE-BASED COMPOUND, MANUFACTURING METHOD OF THE SAME, MANUFACTURING METHOD OF PARTICLES OF ε-IRON OXIDE-BASED COMPOUND, AND MANUFACTURING METHOD OF MAGNETIC RECORDING MEDIUM

CROSS-REFERENCE TO RELATED APPLICATIONS

This application claims priority under 35 USC 119 from Japanese Patent Application No. 2018-066008 filed on Mar. 29, 2018, the disclosure of which is incorporated by reference herein in its entirety.

BACKGROUND OF THE INVENTION

1. Field of the Invention

The present disclosure relates to particles of a β-iron oxyhydroxide-based compound, a manufacturing method of the same, a manufacturing method of particles of a ε-iron oxide-based compound, and a manufacturing method of a magnetic recording medium.

2. Description of the Related Art

In recent years, a crystal structure of epsilon type iron oxide (hereinafter, also referred to as "ε-Fe$_2$O$_3$" or "ε-iron oxide") exhibiting extremely high coercivity while being nanosized particles is attracting attention as a magnetic material used in a magnetic recording medium, along with realization of high performance of a magnetic recording medium.

As a method of manufacturing a crystal structure of the ε-iron oxide, a method using beta-type iron oxyhydroxide (hereinafter, also referred to as "β-FeOOH" or "β-iron oxyhydroxide") as a raw material has been known.

For example, a manufacturing method of iron oxide magnetic nanoparticle powder formed of iron oxide magnetic nanoparticles which is a single-phase ε-Fe$_2$O$_3$ having an average particle diameter equal to or smaller than 15 nm, the method including, mixing β-FeOOH having an average particle diameter equal to or smaller than 15 nm and pure water, preparing a dispersion liquid having a Fe-converted concentration of 0.01 mol/L to 1 mol/L, adding 3 mol to 30 mol of ammonia per 1 mol of β-FeOOH with dropwise addition of an ammonia aqueous solution and stirring the mixture at 0° C. to 100° C., further adding 0.5 mol to 15 mol of tetraethoxysilane per 1 mol of β-FeOOH dropwise, stirring the mixture for 15 hours to 30 hours and cooling to room temperature, adding 1 mol to 30 mol of ammonium sulfate per 1 mol of β-FeOOH to separate a precipitate, performing collection, washing with pure water, drying, and pulverization to obtain a pulverized product, performing a heat treatment and a particle disintegration treatment on the pulverized product under an acid atmosphere at a temperature equal to or higher than 900° C. and lower than 1,200° C. for 0.5 hours to 10 hours, adding and stirring a sodium hydroxide aqueous solution to remove silicon oxide, and obtaining iron oxide magnetic nanoparticle powder has been known (for example, see JP5966964B).

SUMMARY OF THE INVENTION

However, in recent years, a magnetic recording medium capable of obtaining a high signal to noise ratio (SNR), even in a case where a signal is reproduced by using a high-sensitivity reproducing head such as a magneto-resistance (MR) head is required. In a case of using a crystal structure of ε-iron oxide as a magnetic material of a magnetic recording medium, it is important that the crystal structure of ε-iron oxide has a small particle diameter and a small coefficient of variation of particle diameters (that is, a small variation of particle diameters), from a viewpoint of exhibiting a high SNR. However, on the other hand, in a case where a crystal structure of ε-iron oxide has a small particle diameter in a magnetic tape which is one kind of the magnetic recording medium, film quality of a magnetic layer including the crystal structure of ε-iron oxide becomes weak.

In regards to such a problem, the inventors have focused on β-iron oxyhydroxide which is a raw material of the crystal structure of ε-iron oxide, conducted various researches, and determined that the control of a particle diameter of β-iron oxyhydroxide is effective.

An object of one embodiment of the invention is to provide particles of a β-iron oxyhydroxide-based compound, with which magnetic particles capable of manufacturing a magnetic recording medium having an excellent SNR and excellent film hardness of a magnetic layer can be formed.

In addition, an object of another embodiment of the invention is to provide a manufacturing method of particles of a β-iron oxyhydroxide-based compound, with which magnetic particles capable of manufacturing a magnetic recording medium having an excellent SNR and excellent film hardness of a magnetic layer can be formed.

Further, an object of still another embodiment of the invention is to provide a manufacturing method of particles of a ε-iron oxide-based compound capable of manufacturing a magnetic recording medium having an excellent SNR and excellent film hardness of a magnetic layer.

Furthermore, an object of still another embodiment of the invention is to provide a manufacturing method of a magnetic recording medium having an excellent SNR and excellent film hardness of a magnetic layer.

Means for achieving the aforementioned objects include the following aspects.

<1> A Particle of a β-iron oxyhydroxide-based compound represented by Formula (1), in which an average equivalent circle diameter of primary particles is 5 nm to 30 nm, and a coefficient of variation of equivalent circle diameters of the primary particles is 10% to 30%.

$$\beta\text{-A}_a\text{Fe}_{1-a}\text{OOH} \tag{1}$$

In Formula (1), A represents at least one kind of metal element other than Fe, and a represents a number that satisfies a relationship of 0≤a<1.

<2> The particle of a β-iron oxyhydroxide-based compound according to <1>, in which A in Formula (1) is at least one kind of metal element selected from the group consisting of Ga, Co, and Ti, and a represents a number that satisfies a relationship of 0<a<1.

<3> The particle of a β-iron oxyhydroxide-based compound according to <1> or <2>, in which the average equivalent circle diameter of the primary particles is 7 nm to 15 nm, and the coefficient of variation of equivalent circle diameters of the primary particles is 10% to 20%.

<4> The particle of a β-iron oxyhydroxide-based compound according to any one of <1> to <3> which is used in formation of magnetic particles.

<5> A manufacturing method of particles of a β-iron oxyhhydroxide-based compound, the method comprising:

adding an alkali agent to an aqueous solution including a compound including trivalent ferrous ions to obtain a particle dispersion liquid of a β-iron oxyhydroxide-based compound represented by Formula (1); and extracting particles of the β-iron oxyhydroxide-based compound represented by Formula (1), in which an average equivalent circle diameter of primary particles is 5 nm to 30 nm, and a coefficient of variation of equivalent circle diameters of the primary particles is 10% to 30%, from the particle dispersion liquid by classification means.

$$\beta\text{-}A_aFe_{1-a}OOH \qquad (1)$$

In Formula (1), A represents at least one kind of metal element other than Fe and a represents a number that satisfies a relationship of $0 \leq a < 1$.

<6> A manufacturing method of particles of a ε-iron oxide-based compound, the method comprising: adding a silane compound including a hydrolyzable group to a dispersion liquid of the particles of a β-iron oxyhydroxide-based compound according to any one of <1> to <4> or particles of a β-iron oxyhydroxide-based compound obtained by the manufacturing method according to <5> to obtain a precursor particle dispersion liquid; extracting precursor particles from the precursor particle dispersion liquid; performing heat treatment with respect to the precursor particles at a temperature of 800° C. to 1,400° C. to obtain heat-treated particles; and adding the heat-treated particles to an alkali aqueous solution.

<7> A manufacturing method of a magnetic recording medium, the method comprising: preparing a magnetic layer forming composition using particles of a ε-iron oxide-based compound obtained by the manufacturing method according to <6>; applying the magnetic layer forming composition onto a non-magnetic support to form a magnetic layer forming composition layer; performing an alignment in magnetic field with respect to the formed magnetic layer forming composition layer; and drying the magnetic layer forming composition layer subjected to the alignment in magnetic field to form a magnetic layer.

According to the one embodiment of the invention, particles of a β-iron oxyhydroxide-based compound, with which magnetic particles capable of manufacturing a magnetic recording medium having an excellent SNR and excellent film hardness of a magnetic layer can be formed, is provided.

In addition, according to the other embodiment of the invention, a manufacturing method of particles of a β-iron oxyhydroxide-based compound, with which magnetic particles capable of manufacturing a magnetic recording medium having an excellent SNR and excellent film hardness of a magnetic layer can be formed, is provided.

Further, according to the other embodiment of the invention, a manufacturing method of particles of a ε-iron oxide-based compound capable of manufacturing a magnetic recording medium having an excellent SNR and excellent film hardness of a magnetic layer is provided.

Furthermore, according to the other embodiment of the invention, a manufacturing method of a magnetic recording medium having an excellent SNR and excellent film hardness of a magnetic layer is provided.

DESCRIPTION OF THE PREFERRED EMBODIMENTS

Hereinafter, examples of particles of a β-iron oxyhydroxide-based compound, a manufacturing method of the same, a manufacturing method of particles of a ε-iron oxide-based compound, and a manufacturing method of a magnetic recording medium, to which the invention is applied, will be described. However, the invention is not limited to the following embodiments and modification can be suitably performed within a range of the objects of the invention.

In this disclosure, a numerical value range shown with "to" means a range including numerical values written before and after "to", respectively as the minimum value and the maximum value.

In the numerical value range disclosed in a stepwise manner in this disclosure, an upper limit value or a lower limit value disclosed in a certain numerical value range may be replaced with an upper limit value or a lower limit value of another numerical value range disclosed in a stepwise manner. In addition, in the numerical value range disclosed in this disclosure, an upper limit value or a lower limit value disclosed in a certain numerical value range may be replaced with values shown in examples.

In this disclosure, a combination of two or more preferable aspects is a more preferable aspect.

In this disclosure, in a case where a plurality of substances corresponding to each component are present, the amount of each component means a content of the plurality of substances, unless otherwise noted.

In this disclosure, a term "step" not only means an independent step, but also includes a step, as long as the intended object of the step is achieved, even in a case where the step cannot be clearly distinguished from another step.

In this disclosure, "primary particles" indicates independent particles which are not aggregated. In addition, in this disclosure, "secondary particles" indicates aggregated particles (so-called aggregate).

The "β-iron oxyhydroxide-based compound" of this disclosure includes a β-iron oxyhydroxide-based compound having a crystal structure other than β type (for example, a type, γ type, and δ type), a percentage of which is equal to or less than 30% by mass with respect to the entire crystal structure. The percentage of the crystal structure other than β type is preferably equal to or less than 20% by mass, more preferably equal to or less than 10% by mass, and particularly preferably 0% by mass, with respect to the entire crystal structure, that is, it is particularly preferable that no crystal structure other than β type is included.

Particles of β-Iron Oxyhydroxide-Based Compound

The particles of a β-iron oxyhydroxide-based compound of this disclosure are particles of a β-iron oxyhydroxide-based compound represented by Formula (1), in which an average equivalent circle diameter of primary particles is 5 nm to 30 nm, and a coefficient of variation of equivalent circle diameters of the primary particles is 10% to 30%.

As described above, a crystal structure of ε-iron oxide exhibits extremely great coercivity while being nanosized fine particles, and thus, the crystal structure thereof is attracting attention as a magnetic material. In a case of using the crystal structure of ε-iron oxide as a magnetic material of a magnetic recording medium, particle diameters and a coefficient of variation of particle diameters of the crystal structure of ε-iron oxide are desirably small, from a viewpoint of exhibiting a high SNR. However, on the other hand, in a case where a crystal structure of ε-iron oxide has a small particle diameter in a magnetic tape which is one kind of the magnetic recording medium, film quality of a magnetic layer including the crystal structure of ε-iron oxide becomes weak. Accordingly, in a magnetic recording medium of the related art formed by using the crystal structure of ε-iron oxide as a magnetic material, it was difficult to satisfy both the excellent SNR and the excellent film hardness.

In regards to such a problem, the inventors have focused on particles of a β-iron oxyhydroxide-based compound which is a raw material of particles of ε-iron oxide, conducted researches, and found that it is possible to form magnetic particles (that is, particles of ε-iron oxide) capable of exhibiting a high SNR without a deterioration of film hardness of a magnetic layer, by controlling particle diameters and a coefficient of variation of particle diameters of the particles of the β-iron oxyhydroxide-based compound. More specifically, regarding the particles of the β-iron oxyhydroxide-based compound of this disclosure, by setting the average equivalent circle diameter of primary particles as 5 nm to 30 nm, and a coefficient of variation of equivalent circle diameters of the primary particles as 10% to 30%, it is possible to form magnetic particles (particularly, particles of ε-iron oxide) capable of manufacturing a magnetic recording medium having an excellent SNR and excellent film hardness of a magnetic layer.

With respect to this, JP5966964B discloses a manufacturing method of iron oxide nanoparticle powder (so-called particles of ε-iron oxide) formed by using particles of β-iron oxyhydroxide as a raw material. However, according to the confirmation of the inventors, it is determined that an average equivalent circle diameter and a coefficient of variation of equivalent circle diameters of the particles of β-iron oxyhydroxide disclosed in JP5966964B are beyond the range of this disclosure (see Comparative Example 6 which will be described later). In addition, the inventors have manufactured the particles of ε-iron oxide by the method according to JP5966964B, and confirmed that the particles ε-iron oxide capable of manufacturing a magnetic recording medium having an excellent SNR and excellent film hardness of a magnetic layer, as the particles of the β-iron oxyhydroxide-based compound of this disclosure, are not obtained (see Comparative Example 6 which will be described later).

Use

The particles of the β-iron oxyhydroxide-based compound of this disclosure can be suitably used in the formation of magnetic particles. According to the magnetic particles formed by using the particles of β-iron oxyhydroxide-based compound of this disclosure, it is possible to manufacture a magnetic recording medium having an excellent SNR and excellent film hardness of a magnetic layer.

In addition, since the particles of β type iron oxyhydroxide easily form particles of ε type iron oxide, the particles of β type iron oxyhydroxide can be suitably used particularly in the formation of the ε-iron oxide-based compound among the magnetic particles.

Average Equivalent Circle Diameter and Coefficient of Variation of Equivalent Circle Diameters In the particles of the β-iron oxyhydroxide-based compound of this disclosure, an average equivalent circle diameter of primary particles is 5 nm to 30 nm, and a coefficient of variation of equivalent circle diameters of the primary particles is 10% to 30%.

Since the average equivalent circle diameter of the primary particles is equal to or greater than 5 nm, it is possible to realize formation of magnetic particles capable of manufacturing a magnetic recording medium having excellent film hardness of a magnetic layer. In addition, since the average equivalent circle diameter of the primary particles is equal to or smaller than 30 nm, it is possible to realize formation of magnetic particles capable of manufacturing a magnetic recording medium having an excellent SNR. Since the average equivalent circle diameter of the primary particles is 5 nm to 30 nm and the coefficient of variation of equivalent circle diameters of the primary particles is 10% to 30%, it is possible to realize formation of magnetic particles capable of manufacturing a magnetic recording medium satisfying both excellent SNR and excellent film hardness with excellent balance.

The average equivalent circle diameter of the primary particles is preferably 6 nm to 20 nm and more preferably 7 nm to 15 nm.

The coefficient of variation of equivalent circle diameters of the primary particles is preferably 10% to 25% and more preferably 10% to 20%.

In addition, it is preferable that the average equivalent circle diameter of the primary particles is 6 nm to 20 nm and the coefficient of variation of equivalent circle diameters of the primary particles is 10% to 25%, it is more preferable that the average equivalent circle diameter of the primary particles is 6 nm to 20 nm and the coefficient of variation of equivalent circle diameters of the primary particles is 10% to 20%, and it is even more preferable that the average equivalent circle diameter of the primary particles is 7 nm to 20 nm and the coefficient of variation of equivalent circle diameters of the primary particles is 10% to 20%.

In this disclosure, the "average equivalent circle diameter of the primary particles of the particles of the β-iron oxyhydroxide-based compound" is obtained by the following method.

The particles of the β-iron oxyhydroxide-based compound are imaged with a transmission electron microscope (TEM) at an imaging magnification ratio of 80,000 and printed on photographic printing paper so that the total magnification ratio becomes 500,000. The primary particle is selected from the printed particles and an outline of the primary particle is traced with a digitizer. A diameter (equivalent circle area diameter) of a circle having the same area as the traced region is obtained by using image analysis software.

The equivalent circle area diameters of 500 particles which are randomly extracted from the primary particles printed on the plurality of photographic printing paper are calculated. By performing simple averaging (that is, number averaging) of the obtained equivalent circle area diameters of 500 particles, an average equivalent circle diameter of the primary particles is obtained.

In this disclosure, the "coefficient of variation of equivalent circle diameters of the primary particles of the particles of the β-iron oxyhydroxide-based compound (unit: %)" is obtained by dividing a standard deviation of the equivalent circle diameters of the primary particles obtained as described above by the average equivalent circle diameter and multiplying by 100.

As the transmission electron microscope, for example, a transmission electron microscope (model number: H-9000) manufactured by Hitachi, Ltd. can be used. However, the transmission electron microscope is not limited thereto.

The image analysis software, for example, image analysis software (product name: KS-400) manufactured by Carl Zeiss can be used. However, the image analysis software is not limited thereto.

The average equivalent circle diameter of primary particles of the particles of a β-iron oxyhydroxide-based compound can be controlled depending on the kind of metal element to be substituted, the added amount of raw materials and reagent used for synthesis, a reaction temperature, a timing and speed for addition of raw materials, a stirring speed, and the like.

For example, the equivalent circle diameter of primary particles of the particles of a β-iron oxyhydroxide-based compound can be, for example, increased by increasing the reaction temperature and can be decreased by decreasing the reaction temperature.

In a case where the particles of a β-iron oxyhydroxide-based compound of this disclosure form secondary particles, an average equivalent circle diameter of the secondary particles is preferably 5 nm to 30 nm, more preferably 6 nm to 20 nm, and even more preferably 7 nm to 15 nm. In addition, a coefficient of variation of the equivalent circle diameters of the secondary particles is preferably 10% to 30%, more preferably 10% to 25%, and even more preferably 10% to 20%.

In addition, it is preferable that the average equivalent circle diameter of the secondary particles is 5 nm to 30 nm and the coefficient of variation of the equivalent circle diameters of the secondary particles is 10% to 30%, it is more preferable that the average equivalent circle diameter of the secondary particles is 6 nm to 20 nm and the coefficient of variation of the equivalent circle diameters of the secondary particles is 10% to 25%, it is even more preferable that the average equivalent circle diameter of the secondary particles is 6 nm to 20 nm and the coefficient of variation of the equivalent circle diameters of the secondary particles is 10% to 20%, and it is particularly preferable that the average equivalent circle diameter of the secondary particles is 7 nm to 20 nm and the coefficient of variation of the equivalent circle diameters of the secondary particles is 10% to 20%.

In this disclosure, the "average equivalent circle diameter of secondary particles of the particles of a β-iron oxyhydroxide-based compound" is obtained by the following method.

The particles of the β-iron oxyhydroxide-based compound are imaged with a transmission electron microscope (TEM) at an imaging magnification ratio of 80,000 and printed on photographic printing paper so that the total magnification ratio becomes 500,000. The secondary particle is selected from the printed particles and an outline of the secondary particle is traced with a digitizer. A diameter (equivalent circle area diameter) of a circle having the same area as the traced region is obtained by using image analysis software.

The equivalent circle area diameters of 200 particles which are randomly extracted from the secondary particles printed on the plurality of photographic printing paper are calculated. By performing simple averaging (that is, number averaging) of the obtained equivalent circle area diameters of 200 particles, an average equivalent circle diameter of the secondary particles is obtained.

In this disclosure, the "coefficient of variation of equivalent circle diameters of the secondary particles of the particles of the β-iron oxyhydroxide-based compound (unit: %)" is obtained by dividing a standard deviation of the equivalent circle diameters of the secondary particles obtained as described above by the average equivalent circle diameter and multiplying by 100.

Specific examples of the transmission electron microscope and the image analysis software are as described above. However, the transmission electron microscope and the image analysis software are not limited to the specific examples described above.

Composition

The β-iron oxyhydroxide-based compound is a compound represented by Formula (1).

$$\beta\text{-}A_a Fe_{1-a} OOH \quad (1)$$

In Formula (1), A represents at least one kind of metal element other than Fe, and a represents a number that satisfies a relationship of $0 \leq a < 1$.

The compound represented by Formula (1) includes β-FeOOH and a compound in which a part of $Fe^{3+}$ ion site of β-FeOOH is substituted with a metal element other than Fe.

By substituting a part of $Fe^{3+}$ ion site of β-FeOOH with a metal element other than Fe, it is possible to preferably control magnetic properties of the ε-iron oxide-based compound, in a case of forming the particles of the ε-iron oxide-based compound, for example.

The kind and the number of metal elements are not particularly limited, as long as A in Formula (1) is at least one kind of metal element other than Fe.

For example, from viewpoints of more easily forming a crystal structure of ε-iron oxide and more easily stabilizing the formed crystal structure, A in Formula (1) is preferably at least one kind of metal element selected from the group consisting of Ga, Al, In, Rh, Co, Ni, Mn, Zn, Ti, and Sn, more preferably at least one kind of metal element selected from the group consisting of Ga, Co, and Ti, and even more preferably include Ga.

a in Formula (1) preferably represents a number that satisfies a relationship of $0 < a < 1$, more preferably represents a number that satisfies a relationship of $0 < a < 0.8$, and even more preferably represents a number that satisfies a relationship of $0.05 < a < 0.6$, for example, from viewpoints of controlling the magnetic properties and forming properties and stability of an ε phase.

Among the compound represented by Formula (1), a compound represented by Formula (2), a compound represented by Formula (3), a compound represented by Formula (4), a compound represented by Formula (5), and a compound represented by Formula (6) are preferable aspects.

Among these, the compound represented by Formula (6) is preferable, from a viewpoint of easily realizing an even more excellent SNR.

$$\beta\text{-}Z_z Fe_{1-z} OOH \quad (2)$$

In Formula (2), Z represents at least one kind of trivalent metal element selected from the group consisting of Ga, Al, In, and Nb. z represents a number that satisfies a relationship of $0 < z < 1$.

Z in Formula (2) is preferably at least one kind of metal element selected from Ga or Al and is more preferably Ga, for example, from viewpoints of controlling the magnetic properties and forming properties and stability of an ε phase.

z in Formula (2) preferably represents a number that satisfies a relationship of $0 < z < 0.9$ and more preferably represents a number that satisfies a relationship of $0.05 < z < 0.6$, for example, from viewpoints of controlling the magnetic properties and forming properties and stability of an ε phase.

Specific examples of the compound represented by Formula (2) include $Ga_{(0.12)}Fe_{(0.88)}OOH$, $Ga_{(0.25)}Fe_{(0.75)}OOH$, and $Ga_{(0.30)}Fe_{(0.70)}OOH$.

$$\beta\text{-}X_x Y_y Fe_{1-x-y} OOH \quad (3)$$

In Formula (3), X represents at least one kind of divalent metal element selected from the group consisting of Co, Ni, Mn, and Zn, and Y represents at least one kind of tetravalent metal element selected from Ti or Sn. x represents a number that satisfies a relationship of $0 < x < 0.5$ and y represents a number that satisfies a relationship of $0 < y < 0.5$.

X in Formula (3) is preferably at least one kind of metal element selected from Co or Mn and is more preferably Co, for example, from viewpoints of controlling the magnetic properties and forming properties and stability of an ε phase. From the same viewpoints, Y in Formula (3) is preferably Ti.

Regarding x and y in Formula (3), it is preferable that x represents a number that satisfies a relationship of 0<x<0.25 and y represents a number that satisfies a relationship of 0<y<0.25, for example, from viewpoints of controlling the magnetic properties and forming properties and stability of an ε phase.

Specific examples of the compound represented by Formula (3) include $Co_{(0.05)}Ti_{(0.05)}Fe_{(0.90)}OOH$ and $Co_{(0.07)}Ti_{(0.07)}Fe_{(0.86)}OOH$.

$$\beta\text{-}X_xZ_zFe_{1-x-z}OOH \quad (4)$$

In Formula (4), X represents at least one kind of divalent metal element selected from the group consisting of Co, Ni, Mn, and Zn, and Z represents at least one kind of trivalent metal element selected from the group consisting of Ga, Al, and In. x represents a number that satisfies a relationship of 0<x<0.5 and z represents a number that satisfies a relationship of 0<z<0.5.

X in Formula (4) is preferably at least one kind of metal element selected from Co or Mn and is more preferably Co, for example, from viewpoints of controlling the magnetic properties and forming properties and stability of an ε phase. From the same viewpoints, Z in Formula (4) is preferably at least one kind of metal element selected from Ga or Al and is more preferably Ga.

Regarding x and z in Formula (4), it is preferable that x represents a number that satisfies a relationship of 0<x<0.25 and z represents a number that satisfies a relationship of 0<z<0.3, for example, from viewpoints of controlling the magnetic properties and forming properties and stability of an ε phase.

Specific examples of the compound represented by Formula (4) include $Ga_{(0.25)}Co_{(0.05)}Fe_{(0.70)}OOH$ and $Ga_{(0.30)}Co_{(0.05)}Fe_{(0.65)}OOH$.

$$\beta\text{-}Y_yZ_zFe_{1-y-z}OOH \quad (5)$$

In Formula (5), Y represents at least one kind of tetravalent metal element selected from Ti or Sn, and Z represents at least one kind of trivalent metal element selected from the group consisting of Ga, Al, and In. y represents a number that satisfies a relationship of 0<y<0.5 and z represents a number that satisfies a relationship of 0<z<0.5.

Y in Formula (5) is preferably Ti, for example, from viewpoints of controlling the magnetic properties and forming properties and stability of an ε phase. From the same viewpoints, Z in Formula (5) is preferably at least one kind of metal element selected from Ga or Al and is more preferably Ga.

Regarding y and z in Formula (5), for example, it is preferable that y represents a number that satisfies a relationship of 0<y<0.25 and z represents a number that satisfies a relationship of 0<z<0.3, from viewpoints of controlling the magnetic properties and forming properties and stability of an ε phase.

Specific examples of the compound represented by Formula (5) include $Ga_{(0.3)}Ti_{(0.05)}Fe_{(0.65)}OOH$ and $Ga_{(0.25)}Ti_{(0.05)}Fe_{(0.7)}OOH$.

$$\beta\text{-}X_xY_yZ_zFe_{1-x-y-z}OOH \quad (6)$$

In Formula (6), X represents at least one kind of divalent metal element selected from the group consisting of Co, Ni, Mn, and Zn, Y represents at least one kind of tetravalent metal element selected from Ti or Sn, and Z represents at least one kind of trivalent metal element selected from the group consisting of Ga, Al, and In. x represents a number that satisfies a relationship of 0<x<0.5, y represents a number that satisfies a relationship of 0<y<0.5, z represents a number that satisfies a relationship of 0<z<0.5, and x+y+z<1.

X in Formula (6) is preferably at least one kind of metal element selected from Co or Mn and is more preferably Co, for example, from viewpoints of controlling the magnetic properties and forming properties and stability of an ε phase. From the same viewpoints, Y in Formula (6) is preferably Ti. In addition, from the same viewpoints, Z in Formula (6) is preferably at least one kind of metal element selected from Ga or Al and is more preferably Ga.

Regarding x, y, and z in Formula (6), for example, it is preferable that x represents a number that satisfies a relationship of 0<x<0.25, y represents a number that satisfies a relationship of 0<y<0.25, and z represents a number that satisfies a relationship of 0<z<0.3, and it is more preferable that x represents a number that satisfies a relationship of 0<x<0.15, y represents a number that satisfies a relationship of 0<y<0.15, and z represents a number that satisfies a relationship of 0<z<0.3, from viewpoints of controlling the magnetic properties and forming properties and stability of an ε phase.

Specific examples of the compound represented by Formula (6) include $Ga_{(0.12)}Co_{(0.25)}Ti_{(0.025)}Fe_{(0.83)}OOH$, $Ga_{(0.15)}Co_{(0.025)}Ti_{(0.025)}Fe_{(0.8)}OOH$, $Ga_{(0.10)}Co_{(0.025)}Ti_{(0.025)}Fe_{(0.85)}OOH$, $Ga_{(0.25)}Co_{(0.005)}Ti_{(0.005)}Fe_{(0.74)}OOH$, $Ga_{(0.20)}Co_{(0.0125)}Ti_{(0.0125)}Fe_{(0.775)}OOH$, $Ga_{(0.1325)}Co_{(0.025)}Ti_{(0.025)}Fe_{(0.8175)}OOH$, and $Ga_{(0.125)}Co_{(0.025)}Ti_{(0.025)}Fe_{(0.825)}OOH$.

The confirmation of the iron oxyhydroxide-based compound having a β type crystal structure can be performed, for example, by an X-ray diffraction (XRD) method.

In addition, the composition of the β-iron oxyhydroxide-based compound is confirmed by a high-frequency inductively coupled plasma (ICP) emission spectral analysis method.

Specifically, a vessel containing 12 mg of particles of a sample and 10 mL of a hydrochloric acid aqueous solution having a concentration of 4 mol/L is held on a hot plate at a set temperature of 80° C. for 3 hours, and a solution is obtained. Then, the obtained solution is filtered by using a membrane filter having a hole diameter of 0.1 μm. The element analysis of the filtrate obtained is performed by using a high-frequency inductively coupled plasma (ICP) emission spectral analysis device. A content of each metal atom with respect to 100 atom % of iron atoms is obtained based on the result obtained from the element analysis. The composition is confirmed based on the obtained content.

As a measurement device, ICPS-8100 (product name) manufactured by Shimadzu Corporation can be suitably used, for example. However, the measurement device is not limited thereto.

Shape

The shape of the particles of the β-iron oxyhydroxide-based compound is not particularly limited and a shape such as a sphere shape, a rod shape, or a needle shape is used, for example.

Among these, the shape of the particles of the β-iron oxyhydroxide-based compound is preferably a sphere shape. A specific surface area of the sphere shape can be further decreased, compared to cases of the other shapes, and accordingly, the sphere shape is preferable from viewpoints of dispersion and alignment of the obtained particles of the ε-iron oxide-based compound, in a case where the β-iron oxyhydroxide-based compound is used in the manufacturing of the particles of the ε-iron oxide-based compound.

Manufacturing Method of Particles of β-Iron Oxyhydroxide-Based Compound

The manufacturing method of the particles of the β-iron oxyhydroxide-based compound of this disclosure includes a step of adding an alkali agent to an aqueous solution including a compound including trivalent ferrous ions to obtain a particle dispersion liquid of a β-iron oxyhydroxide-based compound represented by Formula (1) (hereinafter, also referred to as a "step (A)"), and a step of extracting particles of the β-iron oxyhydroxide-based compound represented by Formula (1), in which an average equivalent circle diameter of primary particles is 5 nm to 30 nm, and a coefficient of variation of equivalent circle diameters of the primary particles is 10% to 30%, from the particle dispersion liquid by classification means (hereinafter, also referred to as a "step (B)").

According to the manufacturing method of the particles of the β-iron oxyhydroxide-based compound of this disclosure, it is possible to obtain particles of a β-iron oxyhydroxide-based compound, with which magnetic particles (particularly, particles of ε-iron oxide-based compound) capable of manufacturing a magnetic recording medium having an excellent SNR and excellent film hardness of the magnetic layer can be formed.

Step (A)

In the step (A), an alkali agent is added to an aqueous solution including a compound including trivalent ferrous ions to obtain a particle dispersion liquid of a β-iron oxyhydroxide-based compound represented by Formula (1).

The compound including trivalent ferrous ions is not particularly limited, and is, for example, preferably a water-soluble inorganic acid salt such as nitrate, sulfate, or chloride, from viewpoint of availability and cost. Specifically, iron (III) nitrate nonahydrate and iron (III) chloride hexahydrate are used.

Metal elements other than iron included in the particles of the β-iron oxyhydroxide-based compound can be included in the aqueous solution including the compound including trivalent ferrous ions.

The metal elements other than iron are, for example, metal elements represented by A in Formula (1). Specifically, Ga, Al, In, Rh, Co, Ni, Mn, Zn, Ti, and Sn are used. By adding the metal elements other than iron and changing the contents thereof, the phase of the obtained iron oxide-based compound can be changed.

A supply source of the metal element other than iron is not particularly limited, and a water-soluble inorganic acid salt such as nitrate, sulfate, or chloride is preferable, from viewpoint of availability and cost, for example.

Specific examples thereof include gallium (III) nitrate octahydrate, cobalt (II) nitrate hexahydrate, titanium (III) sulfate, titanium (IV) sulfate, aluminum (III) nitrate nonahydrate, indium (III) nitrate trihydrate, rhodium (III) nitrate, cobalt (II) chloride hexahydrate, manganese (II) nitrate hexahydrate, manganese (II) chloride tetrahydrate, nickel (II) nitrate hexahydrate, nickel (II) chloride hexahydrate, zinc (II) nitrate hexahydrate, zinc (II) chloride, and tin (IV) chloride pentahydrate.

Water used as a dispersion medium is preferably pure water and ion exchange water.

The aqueous solution including the compound including trivalent ferrous ions may further include at least one kind of compound selected from polyvinylpyrrolidone (PVP) or hexadecyltrimethylammonium bromide. By further including these compounds, particle diameters of particles of a precursor obtained in a step (D) tends to be further homogenized, in a case of using the particles of the β-iron oxyhydroxide-based compound in the manufacturing method of the particles of a ε-iron oxide-based compound of this disclosure which will be described later.

In the step (A), first, the compound including trivalent ferrous ions, and at least one kind of compound selected from the compound including a metal element other than iron included, if necessary, polyvinylpyrrolidone (PVP), or hexadecyltrimethylammonium bromide are added to water and stirred to prepare an aqueous solution.

In the stirring, a well-known method can be used, and for example, stirring using a magnetic stirrer can be performed.

Next, the alkali agent is added while continuing the stirring of the aqueous solution including the compound including trivalent ferrous ions. By adding the alkali agent, hydroxide sol is generated.

Examples of the alkali agent include an ammonia aqueous solution, an aqueous solution of an ammonium salt compound, a sodium hydroxide (NaOH) aqueous solution, and a potassium hydroxide (KOH) aqueous solution.

A concentration of the ammonia aqueous solution and the aqueous solution of an ammonium salt compound can be, for example, 20% by mass to 30% by mass.

A concentration of the sodium hydroxide (NaOH) aqueous solution and the potassium hydroxide (KOH) aqueous solution can be, for example, 0.1% by mass to 1.0% by mass.

The atmosphere during the addition of the alkali agent is not particularly limited. The addition of the alkali agent may be performed, for example, under the atmosphere, that is, in an environment with the air under the ordinary pressure.

In a case of adding the alkali agent, a liquid temperature of the aqueous solution including the compound including trivalent ferrous ions is preferably 4° C. to 70° C., more preferably 10° C. to 60° C., and even more preferably 15° C. to 40° C.

In a case where the liquid temperature is 4° C. to 70° C., the particles of the β-iron oxyhydroxide-based compound tends to be easily formed. In addition, in a case where the liquid temperature is equal to or lower than 70° C., the particles of the β-iron oxyhydroxide-based compound, with which magnetic particles capable of manufacturing a magnetic recording medium having an excellent SNR can be formed, tends to be easily formed.

Step (B)

In a step (B), the particles of the β-iron oxyhydroxide-based compound represented by Formula (1), in which an average equivalent circle diameter of primary particles is 5 nm to 30 nm, and a coefficient of variation of equivalent circle diameters of the primary particles is 10% to 30%, are extracted from the particle dispersion liquid of the β-iron oxyhydroxide-based compound obtained in the step (A) by classification means.

The classification means are not particularly limited, as long as the particles of the β-iron oxyhydroxide-based compound having the average equivalent circle diameter of the primary particles and the coefficient of variation of equivalent circle diameters in the ranges described above can be classified, and well-known classification means can be applied.

For example, examples of the classification means include means such as centrifugal separation and ultrafiltration.

In a case where the classification means are centrifugal separation, the conditions of the centrifugal separation are, for example, preferably set as 20,000 revolutions per minute (rpm; the same applies hereinafter) to 100,000 rpm for 5 minutes to 180 minutes, more preferably set as 30,000 rpm to 100,000 rpm for 5 minutes to 150 minutes, and even more preferably set as 50,000 rpm to 100,000 rpm for 10 minutes to 60 minutes.

In addition, the centrifugal separation with different conditions (rotation speed, rotation time, and the like) can also be performed in multistage, and, for example, are preferably performed in one stage, from a viewpoint of preventing generation of secondary particles due to aggregation of the particles.

The conditions of the centrifugal separation described above are conditions in a case of using a centrifugal separation device (product name: CP100WX) manufactured by Hitachi Koki Co., Ltd.

In a case where the classification means are ultrafiltration, it is possible to classify desired particles by suitably selecting a hole diameter of the ultrafiltration membrane.

Manufacturing Method of Particles of ε-Iron Oxide-Based Compound

The manufacturing method of the particles of the ε-iron oxide-based compound of this disclosure includes a step of adding a silane compound including a hydrolyzable group to a dispersion liquid of the particles of a β-iron oxyhydroxide-based compound of this disclosure or the particles of a β-iron oxyhydroxide-based compound obtained by the manufacturing method of the particles of a β-iron oxyhydroxide-based compound of this disclosure to obtain a precursor particle dispersion liquid (hereinafter, also referred to as a "step (D)"); a step of extracting precursor particles from the precursor particle dispersion liquid (hereinafter, also referred to as a "step (E)"); a step of performing heat treatment with respect to the precursor particles at a temperature of 800° C. to 1,400° C. to obtain heat-treated particles (hereinafter, also referred to as a "step (F)"); and a step of adding the heat-treated particles to an alkali aqueous solution (hereinafter, also referred to as a "step (G)").

Hereinafter, the particles of the β-iron oxyhydroxide-based compound of this disclosure described above and the particles of the β-iron oxyhydroxide-based compound obtained by the manufacturing method of the particles of the β-iron oxyhydroxide-based compound of this disclosure described above are collectively referred to as "particles of the β-iron oxyhydroxide-based compound of this disclosure".

The manufacturing method of the particles of the ε-iron oxide-based compound of this disclosure may further include other steps, according to the object.

As another preferable step, a step (C) which can be included before the step (D) is used, for example. The step (C) includes the following step (C-1) and step (C-2).

Step (C-1): Step of adding a polyvalent carboxylic acid aqueous solution to the particles of the β-iron oxyhydroxide-based compound of this disclosure and extracting generated solid components Step (C-2): Step of re-dispersing the extracted solid components in water In addition, as another preferable step, a step (H) which can be included after the step (G) is used, for example.

Step (H): Step of washing and drying the obtained particles of the ε-iron oxide-based compound Step (C)

In the step (C-1), a polyvalent carboxylic acid aqueous solution is added to the particles of the β-iron oxyhydroxide-based compound of this disclosure. In a case where polyvalent carboxylic acid is added, solid components are generated. The generated solid components are extracted by solid-liquid separation. In the step (C-2), the extracted solid components are re-dispersed in water. By performing this step, a content of an amorphous component in precursor particles obtained in the subsequent step (E) tends to decrease. In addition, in a case of performing the heat treatment in the further subsequent step (F), the generation of undesired fine particles caused by the presence of the amorphous component tends to be prevented.

From a viewpoint of further decreasing the content of the amorphous component in the precursor, it is preferable that the solid components extracted in the step (C-1) are washed with pure water and dried, and then re-dispersed in water.

Examples of polyvalent carboxylic acid include citric acid, tartaric acid, and malic acid.

Among these, citric acid is preferable as polyvalent carboxylic acid, from a viewpoint of causing particle diameters of the particles of the solid component to be further even.

An amount of polyvalent carboxylic acid used is preferably 0.2 mol to 5.0 mol and more preferably 0.5 mol to 2.5 mol with respect to 1 mol of trivalent Fe ions.

After adding polyvalent carboxylic acid, the stirring is preferably performed.

The stirring time can be, for example, 10 minutes to 2 hours.

After the stirring, the solid component is precipitated, and accordingly, the precipitated solid component is extracted.

An extracting method of the solid component is not particularly limited, and a method of performing centrifugal separation is preferably used, from a viewpoint of simplicity of the operation, for example.

The extracted solid component may be washed with water or the like and dried before the subsequent step (C-2).

The drying temperature is not particularly limited, and can be, for example, 60° C. to 100° C.

In the step (C-2), the solid component extracted in the step (C-1) is re-dispersed in water.

Water is preferably pure water and ion exchange water.

Step (D)

In the step (D), a precursor particle dispersion liquid is obtained by adding a silane compound including a hydrolyzable group to a dispersion liquid of the particles of the β-iron oxyhydroxide-based compound of this disclosure.

In a case where the manufacturing method of the particles of the ε-iron oxide-based compound of this disclosure includes the step (C-1) and the step (C-2), in the step (D), the silane compound including a hydrolyzable group is added to the dispersion liquid obtained in the step (C-2) to obtain a precursor particle dispersion liquid.

Examples of the silane compound including a hydrolyzable group include tetraethoxy silane (TEOS: tetraethyl orthosilicate) and tetramethoxy silane.

Among these, as the silane compound including a hydrolyzable group, TEOS is preferable.

An amount of the silane compound including a hydrolyzable group used is preferably an amount so that the amount of Si is 0.5 mol to 30 mol and more preferably an amount so that the amount of Si is 2 mol to 15 mol with respect to 1 mol of Fe.

After adding the silane compound including a hydrolyzable group, the stirring is preferably performed.

The stirring time is not particularly limited and can be, for example, 1 hour to 24 hours.

A liquid temperature during the stirring can be 15° C. to 80° C. and may be increased to 30° C. to 80° C.

After adding the silane compound including a hydrolyzable group, an aggregating agent may be added.

As the aggregating agent, di- or higher valent salt is preferable.

In addition, it is preferable that the aggregating agent has high solubility to water. Here, the "high solubility to water" indicates that 5% by mass or more of a component is dissolved, in a case of adding the component to water at 25° C.

Examples of the aggregating agent include ammonium sulfate and ammonium oxalate.

A liquid temperature during adding the aggregating agent can be, for example, 15° C. to 80° C.

The aggregating agent is preferably added while stirring the aqueous solution.

Step (E)

In the step (E), the precursor particles are extracted from the precursor particle dispersion liquid obtained in the step (D).

A method of extracting the precursor particles is not particularly limited, and a method of performing centrifugal separation is preferably used, from a viewpoint of simplicity of the operation.

The conditions of the centrifugal separation are not particularly limited, and can be, for example, 1,000 rpm to 10,000 rpm for 1 minute to 60 minutes.

The extracted precursor particles may be dried.

The drying method is not particularly limited, and a method using a drying machine (for example, oven) is used, for example.

The precursor particles are particles in which a Si-containing coating film generated by hydrolysis of the silane compound is formed. This Si-containing coating film is assumed as a coating film of oxide or hydroxide of Si.

Step (F)

In the step (F), the precursor particles obtained in the step (E) is subjected to heat treatment at a temperature of 800° C. to 1,400° C. to obtain heat-treated particles. By performing the heat treatment, magnetic properties are imparted to the precursor particles.

The atmosphere in the heat treatment is not particularly limited. For example, the heat treatment may be performed, for example, under the atmosphere, that is, in an environment with the air under the ordinary pressure.

The heat treatment time is not particularly limited and can be, for example, 1 hour to 8 hours.

Step (G)

In the step (G), the heat-treated particles obtained in the step (F) are added to the alkali aqueous solution.

By performing alkali treatment by adding the alkali aqueous solution, the Si-containing coating film remaining in the heat-treated particle is removed.

The alkali aqueous solution is not particularly limited, and preferable examples thereof include strong alkali aqueous solutions such as a sodium hydroxide (NaOH) aqueous solution and a potassium hydroxide (KOH) aqueous solution.

Water which is a solvent of the alkali aqueous solution is preferably pure water or ion exchange water.

The liquid temperature of the alkali aqueous solution is not particularly limited, and can be, for example, equal to or higher than 70° C. Since the solvent is water, the liquid temperature of the alkali aqueous solution is preferably lower than 100° C.

The concentration of the alkali aqueous solution is not particularly limited, and can be, for example, equal to or greater than 4 mol/L.

The alkali aqueous solution, to which the heat-treated particles are added, is preferably stirred.

The stirring time is not particularly limited and can be, for example, 18 hours to 36 hours.

After the alkali treatment, the particles (that is, particles of ε-iron oxide-based compound), from which the Si-containing coating film is removed, are extracted from the alkali aqueous solution.

An extracting method of the particles is not particularly limited, and a method of performing centrifugal separation is preferably used, for example, from a viewpoint of simplicity of the operation.

Step (H)

In the step (H), the particles of the ε-iron oxide-based compound obtained in the step (G) are washed and dried.

During the washing, water may be used and an aqueous solution including a water-soluble polymer may be used.

In a case of using the aqueous solution including a water-soluble polymer, dispersibility of the particles of the ε-iron oxide-based compound in the aqueous solution tends to be improved. In addition, by performing treatment with respect to the surface of the particles of the ε-iron oxide-based compound with the water-soluble polymer, undesired fine particles tend to be efficiently removed by the subsequent solid-liquid separation.

Water used in the washing and water which is the solvent of the aqueous solution including the water-soluble polymer are preferably pure water or ion exchange water.

Examples of the water-soluble polymer include polyvinyl alcohol (PVA), hydroxymethyl cellulose (HMC), and polyvinylpyrrolidone (PVP).

The method of the solid-liquid separation is not particularly limited, and a method of performing the centrifugal separation is preferably used, from a viewpoint of simplicity of the operation, for example.

The conditions of the centrifugal separation are not particularly limited, and can be, for example, 1,000 rpm to 10,000 rpm for 1 minute to 60 minutes.

The drying method of the washed particles of the ε-iron oxide-based compound is not particularly limited, and a method using a drying machine (for example, oven) at an internal atmosphere temperature of 60° C. to 110° C. is used, for example.

ε-Iron Oxide-Based Compound

The particles of the ε-iron oxide-based compound obtained by the manufacturing method of the particles of the ε-iron oxide-based compound of this disclosure are manufactured by using the particles of the β-iron oxyhydroxide-based compound of this disclosure, and accordingly, it is possible to manufacture a magnetic recording medium having an excellent SNR and excellent film hardness of a magnetic layer.

In the manufacturing method of the particles of the ε-iron oxide-based compound of this disclosure, in a case of using the particles of the compound represented by Formula (1) as the particles of the β-iron oxyhydroxide-based compound, the particles of the ε-iron oxide-based compound represented by Formula (1-1) are obtained.

$$\varepsilon\text{-}A_{a1}{}^{1}Fe_{2-a1}O_{3} \qquad (1\text{-}1)$$

In Formula (1-1), $A^1$ represents at least one kind of metal element other than Fe and a1 represents a number that satisfies a relationship of $0 \leq a1 < 2$.

$A^1$ in Formula (1-1) corresponds to A in Formula (1). In addition, a1 in Formula (1-1) is a value corresponding to approximately two times of a in Formula (1).

Hereinafter, the ε-iron oxide-based compound obtained in a case of using the particles of the compound represented by Formulae (2) to (6) as the particles of the β-iron oxyhydroxide-based compound will be described.

In the manufacturing method of the particles of the ε-iron oxide-based compound of this disclosure, in a case of using the particles of the compound represented by Formula (2) as the particles of the β-iron oxyhydroxide-based compound, the particles of the ε-iron oxide-based compound represented by Formula (2-1) are obtained.

$$\varepsilon\text{-}Z^1_{z1}Fe_{2-z1}O_3 \qquad (2\text{-}1)$$

In Formula (2-1), $Z^1$ represents at least one kind of trivalent metal element selected from the group consisting of Ga, Al, In, and Nb. z1 represents a number that satisfies a relationship of 0<z1<2.

$Z^1$ in Formula (2-1) corresponds to Z in Formula (2). In addition, z1 in Formula (2-1) is a value corresponding to approximately two times of z in Formula (2).

In the manufacturing method of the particles of the ε-iron oxide-based compound of this disclosure, in a case of using the particles of the compound represented by Formula (3) as the particles of the β-iron oxyhydroxide-based compound, the particles of the ε-iron oxide-based compound represented by Formula (3-1) are obtained.

$$\varepsilon\text{-}X^1_{x1}Y^1_{y1}Fe_{2-x1-y1}O_3 \qquad (3\text{-}1)$$

In Formula (3-1), $X^1$ represents at least one kind of divalent metal element selected from the group consisting of Co, Ni, Mn, and Zn, and $Y^1$ represents at least one kind of tetravalent metal element selected from Ti or Sn. x1 represents a number that satisfies a relationship of 0<x1<1 and y1 represents a number that satisfies a relationship of 0<y1<1.

$X^1$ and $Y^1$ in Formula (3-1) respectively correspond to X and Y in Formula (3). In addition, x1 and y1 in Formula (3-1) are values corresponding to approximately two times of x and y in Formula (3).

In the manufacturing method of the particles of the ε-iron oxide-based compound of this disclosure, in a case of using the particles of the compound represented by Formula (4) as the particles of the β-iron oxyhydroxide-based compound, the particles of the ε-iron oxide-based compound represented by Formula (4-1) are obtained.

$$\varepsilon\text{-}X^1_{x1}Z^1_{z1}Fe_{2-x1-z1}O_3 \qquad (4\text{-}1)$$

In Formula (4-1), $X^1$ represents at least one kind of divalent metal element selected from the group consisting of Co, Ni, Mn, and Zn, and $Z^1$ represents at least one kind of trivalent metal element selected from the group consisting of Ga, Al, and In. x1 represents a number that satisfies a relationship of 0<x1<1 and z1 represents a number that satisfies a relationship of 0<z1<1.

$X^1$ and $Z^1$ in Formula (4-1) respectively correspond to X and Z in Formula (4). In addition, x1 and z1 in Formula (4-1) are values corresponding to approximately two times of x and z in Formula (4).

In the manufacturing method of the particles of the ε-iron oxide-based compound of this disclosure, in a case of using the particles of the compound represented by Formula (5) as the particles of the β-iron oxyhydroxide-based compound, the particles of the ε-iron oxide-based compound represented by Formula (5-1) are obtained.

$$\varepsilon\text{-}Y^1_{y1}Z^1_{z1}Fe_{2-y1-z1}O_3 \qquad (5\text{-}1)$$

In Formula (5-1), $Y^1$ represents at least one kind of tetravalent metal element selected from Ti or Sn, and $Z^1$ represents at least one kind of trivalent metal element selected from the group consisting of Ga, Al, and In. y1 represents a number that satisfies a relationship of 0<y1<1 and z1 represents a number that satisfies a relationship of 0<z1<1.

$Y^1$ and $Z^1$ in Formula (5-1) respectively correspond to Y and Z in Formula (5). In addition, y1 and z1 in Formula (5-1) are values corresponding to approximately two times of y and z in Formula (5).

In the manufacturing method of the particles of the ε-iron oxide-based compound of this disclosure, in a case of using the particles of the compound represented by Formula (6) as the particles of the β-iron oxyhydroxide-based compound, the particles of the ε-iron oxide-based compound represented by Formula (6-1) are obtained.

$$\varepsilon\text{-}X^1_{x1}Y^1_{y1}Z^1_{z1}Fe_{2-x1-y1-z1}O_3 \qquad (6\text{-}1)$$

In Formula (ε-1), $X^1$ represents at least one kind of divalent metal element selected from the group consisting of Co, Ni, Mn, and Zn, $Y^1$ represents at least one kind of tetravalent metal element selected from Ti or Sn, and $Z^1$ represents at least one kind of trivalent metal element selected from the group consisting of Ga, Al, and In. x1 represents a number that satisfies a relationship of 0<x1<1, y1 represents a number that satisfies a relationship of 0<y1<1, z1 represents a number that satisfies a relationship of 0<z1<1, and a relationship of x1+y1+z1<2.

$X^1$, $Y^1$ and $Z^1$ in Formula (6-1) respectively correspond to X, Y, and Z in Formula (6). In addition, x1, y1, and z1 in Formula (6-1) are values corresponding to approximately two times of x, y, and z in Formula (6).

The confirmation that the particles of the ε-iron oxide-based compound obtained by the manufacturing method of the particles of the ε-iron oxide-based compound of this disclosure are an iron oxide-based compound having an ε type crystal structure can be performed, for example, by an X-ray diffraction (XRD) method.

In addition, the composition of the ε-iron oxide-based compound is confirmed by a high-frequency inductively coupled plasma (ICP) emission spectral analysis method.

The specific confirmation method is the same as a confirmation method of the composition of the β-iron oxyhydroxide-based compound described above, and therefore, the description is omitted here.

As a measurement device, ICPS-8100 (product name) manufactured by Shimadzu Corporation can be suitably used, for example. However, the measurement device is not limited thereto.

A shape of the particles of the ε-iron oxide-based compound is not particularly limited and a shape such as a sphere shape, a rod shape, or a needle shape is used, for example.

Among these, the shape of the particles of the ε-iron oxide-based compound is preferably a sphere shape. A specific surface area of the sphere shape can be further decreased, compared to cases of the other shapes, and accordingly, the sphere shape is preferable from viewpoints of dispersion and alignment, for example.

An average equivalent circle diameter of the particles of the ε-iron oxide-based compound is, for example, preferably 7 nm to 35 nm, more preferably 8 nm to 25 nm, and even more preferably 10 nm to 17 nm.

In a case where the average equivalent circle diameter of the particles of the ε-iron oxide-based compound is equal to or greater than 7 nm, handling properties are further improved. In addition, the crystal structure of ε-iron oxide is further stabilized and the distribution of magnetic properties is further reduced.

In a case where the average equivalent circle diameter of the particles of the ε-iron oxide-based compound is equal to or smaller than 35 nm, a recording density is further improved. In addition, magnetic properties are easily adjusted to magnetic properties suitable for recording and reproducing, and thus, a magnetic recording medium having a more excellent SNR can be realized.

In this disclosure, the "average equivalent circle diameter of the particles of the ε-iron oxide-based compound" means a number average value of equivalent circle diameters of 500 primary particles of the ε-iron oxide-based compound.

Each equivalent circle diameter of each particle of the ε-iron oxide-based compound is obtained based on a transmission electron microscope (TEM) image. Specifically, a diameter of a circle having the same area as the area (that is, projected area) of the particle of the ε-iron oxide-based compound in the TEM image is set as an equivalent circle diameter.

A specific example of a measurement method of the average equivalent circle diameter of the particles of the ε-iron oxide-based compound is as shown in examples which will be described later.

The average equivalent circle diameter of the particles of the ε-iron oxide-based compound can be controlled according to a firing temperature in a case of preparing particles of the ε-iron oxide-based compound, the kind of metal element to be substituted, and the like. For example, the average equivalent circle diameter of the particles of the ε-iron oxide-based compound can be increased by increasing a firing temperature in a case of preparing the particles or can be decreased by decreasing the firing temperature.

Manufacturing Method of Magnetic Recording Medium

The manufacturing method of a magnetic recording medium of this disclosure includes a step of preparing a magnetic layer forming composition using the particles of the ε-iron oxide-based compound obtained by the manufacturing method of the particles of the ε-iron oxide-based compound of this disclosure (hereinafter, also referred to as a "step I"); a step of applying the magnetic layer forming composition onto a non-magnetic support to form a magnetic layer forming composition layer (hereinafter, also referred to as "step II"); a step of performing an alignment in magnetic field with respect to the formed magnetic layer forming composition layer (hereinafter, also referred to as a "step III"); and a step of drying the magnetic layer forming composition layer subjected to the alignment in magnetic field to form a magnetic layer (hereinafter, also referred to as a "step IV").

According to the manufacturing method of the magnetic recording medium of this disclosure, it is possible to manufacture a magnetic recording medium having an excellent SNR and excellent film hardness of the magnetic layer.

The manufacturing method of the magnetic recording medium of this disclosure can further include a step of performing a calender process of the non-magnetic support including the magnetic layer (hereinafter, also referred to as a "step V"), and a step of forming any layer such as a non-magnetic layer or a back coating layer (hereinafter, also referred to as a "step VI"), if necessary. In addition, each step may be divided into two or more stages.

Hereinafter, each step will be described in detail.

Step I

In the step I, the magnetic layer forming composition is prepared by using the particles of the ε-iron oxide-based compound obtained by the manufacturing method of the particles of the ε-iron oxide-based compound of this disclosure.

The details of the process of obtaining the particles of the ε-iron oxide-based compound by the manufacturing method of the particles of the ε-iron oxide-based compound of this disclosure are as described above, and therefore, the description is omitted here.

The step I can include a step of mixing the particles of the ε-iron oxide-based compound, a binding agent, and if necessary, an abrasive, various additives (for example, other additives which will be described later), and a solvent with each other (hereinafter, also referred to as a "step I-1"), and a step of dispersing a mixed solution obtained in the step I-1 (hereinafter, also referred to as a "step I-2").

All of the raw materials such as the particles of the ε-iron oxide-based compound, the abrasive, and the binding agent may be mixed with each other in any stage of the step I.

The raw materials may be mixed with each other at the same time or in two or more parts.

For example, after mixing the binding agent with the other raw materials in the step I-2, the binding agent can be further added and mixed for viscosity adjustment after the dispersion.

In the dispersion of the raw materials of the magnetic layer forming composition, a well-known dispersion apparatus such as a batch type vertical sand mill or a transverse beads mill can be used, for example.

As the dispersion beads, glass beads, zirconia beads, titania beads, and steel beads can be used, for example. A particle diameter (so-called bead diameter) and a filling percentage of the dispersion beads can be suitably optimized and used.

In the dispersion of the raw materials of the magnetic layer forming composition, a well-known ultrasonic device can also be used, for example.

In addition, at least some raw materials of the magnetic layer forming composition may be kneaded by using an open kneader, for example, before the step I-2.

Regarding the raw materials of the magnetic layer forming composition, solutions for the raw materials may be respectively prepared and mixed with each other. For example, a magnetic liquid including particles of a ε-iron oxide-based compound, and an abrasive solution including the abrasive can be respectively prepared, and mixed with each other for dispersion.

Magnetic Layer Forming Composition

The "particles of the ε-iron oxide-based compound" for preparing the magnetic layer forming composition are the same as those described in the section of the "particles of the ε-iron oxide-based compound" and the preferable aspects are also the same as the preferable aspects thereof. Therefore, the description is omitted here.

A content of the particles of the ε-iron oxide-based compound in the magnetic layer forming composition is preferably 5% by mass to 30% by mass and more preferably 8% by mass to 20% by mass with respect to a total mass of the magnetic layer forming composition.

Binding Agent

The magnetic layer forming composition preferably includes a binding agent.

As the binding agent, various resins are used.

The resin used for the binding agent is not particularly limited, as long as a layer satisfying the desired physical properties such as strength and durability can be formed.

The resin used for the binding agent may be a homopolymer or a copolymer. The resin may be a well-known electron beam-curable resin.

Examples of the resin used for the binding agent include polyurethane, a polyester-based resin, a polyamide-based resin, a vinyl chloride-based resin, styrene, acrylonitrile, an acrylic resin obtained by copolymerization of methyl methacrylate, a cellulose resin such as nitrocellulose, an epoxy resin, a phenoxy resin, and a polyvinylalkylal resin such as polyvinyl acetal or polyvinyl butyral.

Among these, as the resin used for the binding agent, at least one kind selected from the group consisting of polyurethane, an acrylic resin, a cellulose-based resin, and a vinyl chloride-based resin is preferable.

The resin used for the binding agent preferably includes a functional group (for example, polar group) adsorbed to the surface of the particles of the ε-iron oxide-based compound in a molecule, from a viewpoint of further improving dispersibility of the particles of the ε-iron oxide-based compound, for example.

Examples of the preferable functional group include —$SO_3M$, —$SO_4M$, —$PO(OM)_2$, —$OPO(OM)_2$, —COOM, =$NSO_3M$, —$NRSO_3M$, —$N^+R^1$, and —$N^+R^1R^2R^3X^-$.

Here, M represents a hydrogen atom or an alkali metal atom such as Na or K. R represents an alkylene group, $R^1$, $R^2$, and $R^3$ each independently represent a hydrogen atom, an alkyl group, or a hydroxyalkyl group. X represents a halogen atom such as Cl or Br.

In a case where the resin used for the binding agent includes the functional group, the content of the functional group in the resin is preferably 0.01 meq/g to 2.0 meq/g, and more preferably 0.3 meq/g to 1.2 meq/g.

In a case where the content of the functional group in the resin is in the range described above, further excellent dispersibility of the particles of the ε-iron oxide-based compound in the magnetic layer is obtained and magnetic flux density can be further improved.

The resin used for the binding agent is more preferably polyurethane including a —$SO_3Na$ group. In a case where polyurethane includes the —$SO_3Na$ group, the content of —$SO_3Na$ group is preferably 0.01 meq/g to 1.0 meq/g with respect to that of polyurethane.

A molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

Conditions
GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)
Sample concentration: 0.5% by mass
Sample injection amount: 10 μL
Flow rate: 0.6 mL/min
Measurement temperature: 40° C.
Detector: RI detector The magnetic layer forming composition may include one kind or two or more kinds of binding agent.

In a case where the magnetic layer forming composition includes the binding agent, the content of the binding agent in the magnetic layer forming composition is not particularly limited, and is, for example, preferably 5 parts by mass to 50 parts by mass and more preferably 10 parts by mass to 30 parts by mass with respect to 100 parts by mass of the particles of the ε-iron oxide-based compound.

In a case where the content of the binding agent in the magnetic layer forming composition is in the range described above with respect to 100 parts by mass of the particles of the ε-iron oxide-based compound, further excellent dispersibility of the particles of the ε-iron oxide-based compound in the magnetic layer is obtained and magnetic flux density can be further improved.

Abrasive

The magnetic layer forming composition can include an abrasive.

The abrasive contributes to reduction of tape damage such as wear or scratches which may occur during running of a magnetic recording medium, and removal of attached materials (so-called debris) attached to a head during use of a magnetic recording medium.

Examples of the abrasive include a-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, for example, mainly particles of a well-known material having Mohs hardness equal to or greater than 6.

As the abrasive, a complex of the abrasives described above (for example, abrasive subjected to surface treatment with another abrasive) may be used. A compound or an element other than the main component may be included in the abrasive, but there is no change in effect as the abrasive, as long as the content of the main component is equal to or greater than 90% by mass.

The shape of the abrasive is not particularly limited and examples thereof include a particle shape such as a needle shape, a sphere shape, a cube shape, and a rectangular shape.

Among these, the shape of the abrasive is preferably a shape having a shape including a corner in a part of the particle, such as a needle shape or a cube shape, from a viewpoint of obtaining further excellent abrasive properties, for example.

An average equivalent circle diameter of particles the abrasive is not particularly limited, and is, for example, preferably 0.01 μm to 2.0 μm, more preferably 0.05 μm to 1.0 μm, and even more preferably 0.05 μm to 0.5 μm, from a viewpoint of more suitably maintaining abrasive properties of the abrasive.

By combining plural kinds of the abrasives having different particle diameters, durability of the magnetic layer can be improved. In addition, by narrowing the particle size distribution of the particles of the abrasive, it is also possible to increase electromagnetic conversion characteristics of the magnetic recording medium.

In this disclosure, the average equivalent circle diameter of the particles the abrasive can be measured by the same method as that of the average equivalent circle diameter of the particles of the β-iron oxyhydroxide-based compound described above.

A BET specific surface area of the abrasive is preferably 1 $m^2$/g to 30 $m^2$/g.

A tap density of the abrasive is preferably 0.3 g/mL to 2 g/mL.

In a case where the magnetic layer forming composition includes an abrasive, one kind or two or more kinds of the abrasive may be included.

As the abrasive, a commercially available product can be used.

Examples of the commercially available product include AKP-12, AKP-15, AKP-20, AKP-30, AKP-50, HIT20, HIT-30, HIT-55, HIT60A, HIT70, HIT80, and HIT100 manufactured by Sumitomo Chemical Co., Ltd., ERC-DBM, HP-DBM, and HPS-DBM manufactured by Reynolds Co., Ltd., WA10000 manufactured by Fujimi Incorporated, UB20 manufactured by Uyemura & Co., Ltd., G-5, Kromex U2, and Kromex U1 manufactured by Nippon Chemical Industrial Co., Ltd., TF100 and TF140 manufactured by Toda Kogyo Corp., Beta Random Ultrafine manufactured by IBIDEN CO., LTD., and B-3 manufactured by Showa KDE Co., Ltd. (all of the above examples are product names).

In a case where the magnetic layer forming composition includes the abrasive, a content of the abrasive in the magnetic layer forming composition is not particularly limited, and is, for example, preferably 0.1 parts by mass to 20 parts by mass and more preferably 0.5 parts by mass to 15 parts by mass, with respect to 100 parts by mass of the particles of the ε-iron oxide-based compound.

In a case where the content of the abrasive in the magnetic layer forming composition is equal to or greater than 0.1 parts by mass with respect to 100 parts by mass of the particles of the ε-iron oxide-based compound, scratch resistance of the magnetic layer to be formed can be further improved.

In a case where the content of the abrasive in the magnetic layer forming composition is equal to or smaller than 20 parts by mass with respect to 100 parts by mass of the particles of the ε-iron oxide-based compound, an effect to the content of the particles of the ε-iron oxide-based compound is small, thereby realizing a magnetic recording medium having a further excellent SNR.

Other Additives

The magnetic layer forming composition may include various additives (so-called other additives), if necessary, other than the particles of the ε-iron oxide-based compound, the abrasive, and the binding agent, within a range not negatively affecting the effects.

Examples of the other additives include a non-magnetic filler, a lubricant, a dispersing agent, a curing agent, a dispersing assistant, an antibacterial agent, an antistatic agent, and an antioxidant.

One component of the other additives may exhibit two or more functions.

Non-Magnetic Filler

The magnetic layer can include a non-magnetic filler.

The non-magnetic filler contributes to adjustment of physical properties of film hardness or surface roughness of the magnetic layer.

In this disclosure, the "non-magnetic filler" means a filler satisfying at least one of a residual magnetic flux density equal to or smaller than 10 mT or coercivity equal to or smaller than 7.98 kA/m (100 Oe).

As the non-magnetic filler, carbon black or inorganic particles are used.

For example, as the non-magnetic filler, colloid particles are preferable, from viewpoints of dispersion stability and uniform disposition in the magnetic layer. In addition, at least one kind selected from the group consisting of carbon black and inorganic colloid particles is preferable, and at least one kind selected from the group consisting of carbon black and inorganic oxide colloid particles is more preferable, as the non-magnetic filler, from a viewpoint of availability, for example.

Examples of the inorganic oxide colloid particles include colloid particles of complex inorganic oxide such as $SiO_2/Al_2O_3$, $SiO_2/B_2O_3$, $TiO_2/CeO_2$, $SnO_2/Sb_2O_3$, $SiO_2/Al_2O_3/TiO_2$, or $TiO_2/CeO_2/SiO_2$, in addition to colloid particles of inorganic oxide such as α-alumina having an α transformation rate equal to or greater than 90%, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide.

As the inorganic oxide colloid particles, silica colloid particles (colloidal silica) are particularly preferable, from a viewpoint of availability of monodisperse colloid particles.

An average particle diameter of the non-magnetic filler is not particularly limited, and is, for example, preferably 30 nm to 300 nm, more preferably 40 nm to 250 nm, and even more preferably 50 nm to 200 nm, from viewpoints of reducing recording errors and ensuring spacing of a magnetic head.

In this disclosure, the average particle diameter of the non-magnetic filler is a value measured by a transmission electron microscope (TEM).

In a case where the magnetic layer forming composition includes the non-magnetic filler, one kind or two or more kinds of the non-magnetic filler may be included.

As the non-magnetic filler, a commercially available product can be used.

In a case where the magnetic layer forming composition includes the non-magnetic filler, a content of the non-magnetic filler in the magnetic layer forming composition is not particularly limited, and is, for example, preferably 0.01 parts by mass to 10 parts by mass with respect to 100 parts by mass of the particles of the ε-iron oxide-based compound.

Lubricant

The magnetic layer forming composition can include a lubricant.

The lubricant contributes to the improvement of running durability of the magnetic recording medium.

As the lubricant, a well-known hydrocarbon-based lubricant and a fluorine-based lubricant can be used.

Examples of the hydrocarbon-based lubricant include a carboxylic acid-based compound such as stearic acid or oleic acid, an ester-based compound such as butyl stearate, a sulfonic acid-based compound such as octadecylsulfonic acid, a phosphoric acid ester-based compound such as monoctadecyl phosphate, an alcohol-based compound such as stearyl alcohol or oleyl alcohol, a carboxylic acid amide-based compound such as stearic acid amide, and an amine-based compound such as stearyl amine.

As the hydrocarbon-based lubricant, a compound including a polar group such as a hydroxyl group, an ester group, or a carboxy group in a hydrocarbon chain of the alkyl group is preferable, from a viewpoint of a high effect of decreasing a frictional force.

As the fluorine-based lubricant, a compound obtained by substituting a part of or the entire alkyl group of the hydrocarbon-based lubricant described above with a fluoroalkyl group or a perfluoropolyether group.

In a case where the magnetic layer forming composition includes the lubricant, one kind or two or more kinds of lubricant may be included.

As the lubricant, a commercially available product can be used.

In a case where the magnetic layer forming composition includes the lubricant, a content of the lubricant in the magnetic layer forming composition is not particularly limited, and is, for example, preferably 0.1 parts by mass to 20 parts by mass and more preferably 0.5 parts by mass to 15 parts by mass, with respect to 100 parts by mass of the particles of the ε-iron oxide-based compound.

Dispersing Agent

The magnetic layer forming composition can include a dispersing agent.

The dispersing agent contributes to improvement of dispersibility of the particles of the ε-iron oxide-based compound and prevention of aggregation of the particles. In addition, the dispersing agent also contributes to the improvement of dispersibility of the abrasive.

As the dispersing agent, an organic compound including a functional group which is adsorbed to the surface of the particles of the ε-iron oxide-based compound is preferable.

As the organic compound including a functional group which is adsorbed to the surface of the particles of the ε-iron oxide-based compound, a compound including one to three groups of an amino group, a carboxy group, a sulfonic acid group, or a sulfinic acid group is used, and a polymer thereof may be used.

Examples of the preferable dispersing agent include compounds represented by structural formulae of R—NH$_2$, NH$_2$—R—NH$_2$, NH$_2$—R(NH$_2$)—NH$_2$, R—COOH, COOH—R—COOH, COOH—R(COOH)—COOH, R—SO$_3$H, SO$_3$H—R—SO$_3$H, SO$_3$H—R(SO$_3$H)—SO$_3$H, R—SO$_2$H, SO$_2$H—R—SO$_2$H, and SO$_2$H—R(SO$_2$H)—SO$_2$H.

R in the structural formulae is linear, branched, or cyclic saturated or unsaturated hydrocarbon, and is preferably an alkyl group having 1 to 20 carbon atoms, for example.

Specific examples of the preferable dispersing agent include oleic acid, stearic acid, and 2,3-dihydroxynaphthalene.

Among these, the dispersing agent is more preferably at least one kind selected from oleic acid or 2,3-dihydroxynaphthalene from a viewpoint of dispersibility.

In a case where the magnetic layer forming composition includes a dispersing agent, one kind or two or more kinds of the dispersing agent may be used.

As the dispersing agent, a commercially available product can be used.

In a case where the magnetic layer forming composition includes the dispersing agent, a content of the dispersing agent in the magnetic layer forming composition is preferably 0.1 parts by mass to 30 parts by mass with respect to 100 parts by mass of the particles of the ε-iron oxide-based compound (in a case of including the abrasive, a total content of the particles of the ε-iron oxide-based compound and the abrasive).

In a case where the content of the dispersing agent in the magnetic layer forming composition is in the range described above with respect to 100 parts by mass of the particles of the ε-iron oxide-based compound (in a case of including the abrasive, a total content of the particles of the ε-iron oxide-based compound and the abrasive), further excellent dispersibility of the particles of the ε-iron oxide-based compound (in a case of including the abrasive, the particles of the ε-iron oxide-based compound and the abrasive) is obtained and scratch resistance of the magnetic layer to be formed can be further improved, for example.

Curing Agent

The magnetic layer forming composition can include a curing agent.

The curing agent contributes to the improvement of film hardness. Depending on the curing agent, by forming a crosslinked structure between the curing agent and the binding agent described above for forming the magnetic layer, film hardness of the magnetic layer can be improved.

As the curing agent, an isocyanate-based compound is preferable.

Examples of the isocyanate-based compound include tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate.

In addition, as the isocyanate-based compound, polyisocyanate such as a reaction product of the isocyanate-based compound described above and polyalcohol, and a condensation product of the isocyanate-based compound described above can also be used.

As the curing agent, a commercially available product can be used.

Examples of the commercially available product of the isocyanate-based compound which is a curing agent include CORONATE (registered trademark) L, CORONATE (registered trademark) HL, CORONATE (registered trademark) 2030, CORONATE (registered trademark) 2031, CORONATE (registered trademark) 3041, MILLIONATE (registered trademark) MR, and MILLIONATE (registered trademark) MTL manufactured by Tosoh Corporation, TAKENATE (registered trademark) D-102, TAKENATE (registered trademark) D-110N, TAKENATE (registered trademark) D-200, and TAKENATE (registered trademark) D-202 manufactured by Mitsui Chemicals, Inc., DESMODUR (registered trademark) L, DESMODUR (registered trademark) IL, DESMODUR (registered trademark) N, and DESMODUR (registered trademark) HL manufactured by Covestro Japan Ltd. (all of the above examples are product names).

In a case where the magnetic layer forming composition includes the curing agent, one kind or two or more kinds of the curing agent may be included.

As the curing agent, a commercially available product can be used.

In a case where the magnetic layer forming composition includes the curing agent, a content of the curing agent in the magnetic layer forming composition can be, for example, greater than 0 parts by mass and equal to or smaller than 80 parts by mass with respect to 100 parts by mass of the binding agent, and is preferably 50 parts by mass to 80 parts by mass, from a viewpoint of improving hardness of each layer such as the magnetic layer.

Solvent

The magnetic layer forming composition preferably includes a solvent.

The solvent can be used as a dispersion medium of the particles of the ε-iron oxide-based compound, the binding agent, and the abrasive.

One kind of the solvent may be used or a mixed solvent of two or more kinds may be used.

As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N,N-dimethylformamide, hexane, and the like can be used, for example. Among these, as the organic solvent, methyl ethyl ketone, cyclohexanone, and a mixed solvent including these at any ratio are preferable.

For example, from a viewpoint of improving dispersibility, a solvent having strong polarity to some extent is preferable as a solvent, and it is preferable that a content of a solvent having dielectric constant equal to or greater than 15 in the magnetic layer forming composition is equal to or greater than 50% by mass with respect to a total mass of the solvent. In addition, a dissolution parameter of the solvent is preferably 8 to 11.

Step II

The manufacturing method of the magnetic recording medium of this disclosure includes a step of applying the magnetic layer forming composition onto the non-magnetic support to form a magnetic layer forming composition layer (that is, the step II), after the step I.

The step II can be performed, for example, by applying the magnetic layer forming composition onto the running non-magnetic support so as to obtain a predetermined film thickness.

In this disclosure, the "non-magnetic support" means a support satisfying at least one of a residual magnetic flux density equal to or smaller than 10 mT and coercivity equal to or smaller than 7.98 kA/m (100 Oe).

The non-magnetic support can be used without particular limitation, as long as it is a well-known non-magnetic support used in the magnetic recording medium.

A material of the non-magnetic support can be suitably selected among the materials not having magnetism, by considering physical properties such as formability or durability, in accordance with the kinds of the magnetic recording medium. As the material of the non-magnetic support, materials such as a resin material not including a magnetic material, an inorganic material not having magnetism, and the like can be used.

Examples of the resin material include a resin material such as polyester such as polyethylene terephthalate (PET) or polyethylene naphthalate (PEN), polyolefin such as polyethylene or polypropylene, a polyamide-based resin such as aromatic polyamide including polyamide, polyamideimide, or polyaramide, polyimide, cellulose triacetate (TAC), polycarbonate (PC), polysulfone, and polybenzoxazole.

Among these, as the resin material, at least one kind selected from the group consisting of polyester and a polyamide-based resin is preferable, and at least one kind selected from the group consisting of polyethylene terephthalate (PET), polyethylene naphthalate (PEN), and polyamide is more preferable, from viewpoints of excellent strength and durability and ease of processing.

The non-magnetic support is selected according to the usage aspect of the magnetic recording medium.

For example, in a case where the magnetic recording medium is a magnetic tape, a flexible disk, or the like, a resin film (or resin sheet) having flexibility can be used as the non-magnetic support.

In a case of using a resin film as the non-magnetic support, the resin film may be an un-stretched film or may be a uniaxially stretched film or a biaxially stretched film. For example, in a case of using a polyester film as the non-magnetic support, a biaxially stretched polyester film may be used from a viewpoint of improving dimensional stability.

The resin film used for the non-magnetic support may have a laminated structure of two or more layers. For example, as disclosed in JP1991-224127A (JP-H03-224127A), a non-magnetic support obtained by laminating a film including two different layers can also be used, in order to change surface roughness of a surface on which a magnetic layer is formed and a surface on which a magnetic layer is not formed.

For example, in order to improve adhesiveness with the magnetic layer to be provided on the surface of the non-magnetic support, surface treatment such as corona discharge, plasma treatment, easy bonding treatment, or heat treatment may be performed on the non-magnetic support in advance, if necessary. In addition, in order to prevent foreign materials from mixing into the magnetic layer, surface treatment such as dust protection treatment may be performed on the non-magnetic support.

These surface treatments can be performed by a well-known method.

A thickness of the non-magnetic support is not particularly limited and is suitably selected according to the use of the magnetic recording medium.

The thickness of the non-magnetic support is, for example, preferably 2.0 µm to 80.0 µm and more preferably 3.0 µm to 50.0 µm.

In a case where the thickness of the non-magnetic support is equal to or greater than 2.0 µm, excellent film forming properties and higher strength can be obtained.

In a case where the thickness of the non-magnetic support is equal to or smaller than 80.0 µm, the thickness of the entire magnetic tape does not become unnecessarily excessively thick.

In a case where the magnetic recording medium is a magnetic tape, the thickness of the non-magnetic support is preferably 2.0 µm to 20.0 µm and more preferably 3.0 µm to 10.0 µm.

As a coating method of applying the magnetic layer forming composition onto the non-magnetic support, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, and spin coating can be used.

Regarding the coating method, "Latest coating technologies" published by Sogo Gijutsu Center (31 May, 1983) can be referred to, for example.

The coating amount of the magnetic layer forming composition is not particularly limited.

The coating amount is suitably adjusted so that the thickness of the magnetic layer becomes a desired value according to a saturation magnetization amount of a magnetic head used in the magnetic recording medium, a head gap length, a recording signal band, and the like.

The magnetic layer forming composition is, for example, preferably applied so that the thickness of the magnetic layer after drying becomes 10 nm to 150 nm, more preferably applied so that the thickness becomes 20 nm to 120 nm, and even more preferably applied so that the thickness becomes 30 nm to 100 nm.

In a case where the thickness of the magnetic layer is equal to or greater than 10 nm, recording density can be further improved.

In a case where the thickness of the magnetic layer is equal to or smaller than 150 nm, noise is further reduced and more excellent electromagnetic conversion characteristics are obtained.

Step III

The manufacturing method of the magnetic recording medium of this disclosure includes a step of performing an alignment in magnetic field with respect to the formed magnetic layer forming composition layer (that is, step III), after the step II.

In a case where the non-magnetic support has a film shape such as a magnetic tape, the alignment in magnetic field of the formed magnetic layer forming composition layer can be performed with respect to the particles of the ε-iron oxide-based compound included in the magnetic layer forming composition by using cobalt magnets or solenoid.

As a method of performing the alignment in magnetic field, a method using a well-known random alignment device such as a method of obliquely alternately disposing cobalt magnets or applying an alternating magnetic field by solenoid is preferable. In addition, isotropic magnetic properties can also be applied in a circumferential direction by performing homeotropic alignment by using a well-known method such as a method using a polar opposing magnet. Particularly, in a case of performing high-density recording, homeotropic alignment is preferable. In addition, circumferential alignment can also be performed by using a spin coating.

The alignment in magnetic field is preferably performed before drying the formed magnetic layer forming composition layer.

The alignment in magnetic field can be performed by a homeotropic alignment process of applying a magnetic field having magnetic field strength of 0.1 T to 1.0 T in a vertical direction to the surface of the applied magnetic layer forming composition.

Step IV

The manufacturing method of the magnetic recording medium of this disclosure includes a step of drying the magnetic layer forming composition layer subjected to the alignment in magnetic field to form a magnetic layer (that is, step IV), after the step III.

The drying of the magnetic layer forming composition layer can be controlled according to a temperature of dry air, an air flow, or an application speed.

For example, the application speed is preferably 20 m/min to 1,000 m/min.

A temperature of the dry air is, for example, preferably equal to or higher than 60° C.

In addition, the magnetic layer forming composition layer may be suitably preliminarily dried before applying a magnetic field.

Step V

The manufacturing method of the magnetic recording medium of this disclosure preferably includes a step of performing a calender process with respect to the non-magnetic support including the magnetic layer (that is, step V), after performing the step I, the step II, the step III, and the step IV.

The non-magnetic support including the magnetic layer is temporarily wound with a winding roll, unwound from the winding roll, and supplied for the calender process.

According to the calender process, surface smoothness is improved, and a filling percentage of the particles of the ε-iron oxide-based compound in the magnetic layer is improved due to disappearance of holes generated due to removal of the solvent at the time of drying. Accordingly, it is possible to obtain a magnetic recording medium having high electromagnetic conversion characteristics (for example, SNR).

The step V is preferably performed while changing calender process conditions according to smoothness of the surface of the magnetic layer.

In the calender process, a super calender roll or the like can be used, for example.

As a calender roll, a heat resistant plastic roll formed of resins such as an epoxy-based resin, a polyimide-based resin, a polyamide-based resin, or a polyamideimide-based resin can be used. In addition, the process can also be performed by using a metal roll.

As the calender process conditions, a temperature of the calender roll can be, for example, 60° C. to 120° C. and can be preferably set as 80° C. to 100° C., and pressure can be, for example, 100 kg/cm to 500 kg/cm (98 kN/m to 490 kN/m) and can be preferably set as 200 kg/cm to 450 kg/cm (196 kN/m to 441 kN/m).

Step VI

The manufacturing method of the magnetic recording medium of this disclosure can include a step of forming any layer such as a non-magnetic layer and a back coating layer (that is, step VI), if necessary.

The non-magnetic layer is a layer contributing to thinning of the magnetic layer. The non-magnetic layer can be provided between the non-magnetic support and the magnetic layer.

The back coating layer is a layer contributing to running stability. The back coating layer can be provided on a surface of the non-magnetic support on a side opposite to the magnetic layer side.

The non-magnetic layer and the back coating layer can be respectively formed through the same step as the step II and the step IV of the magnetic layer, after preparing compositions for forming the respective layers (so-called non-magnetic layer forming composition and back coating layer forming composition).

The non-magnetic layer includes a layer not having magnetism, and a substantially non-magnetic layer including a small amount of a ferromagnetic material (for example, particles of the ε-iron oxide-based compound) as impurities or intentionally.

In this disclosure, the "non-magnetic layer" means a layer satisfying at least one of a residual magnetic flux density equal to or smaller than 10 mT or coercivity equal to or smaller than 7.98 kA/m (100 Oe).

Non-Magnetic Layer Forming Composition

Non-Magnetic Particles

The non-magnetic layer forming composition preferably includes non-magnetic particles.

The non-magnetic particles can function as a filler.

In this disclosure, the "non-magnetic particles" mean particles satisfying at least one of a residual magnetic flux density equal to or smaller than 10 mT or coercivity equal to or smaller than 7.98 kA/m (100 Oe).

The non-magnetic particles may be inorganic particles or organic particles.

As the non-magnetic particles, carbon black can also be used.

Examples of the inorganic particles include particles of metal, metal oxide, metal carbonate, metal sulfate, metal nitride, metal carbide, and metal sulfide.

Specific examples of the non-magnetic particles include titanium oxide such as titanium dioxide, cerium oxide, tin oxide, tungsten oxide, ZnO, $ZrO_2$, $SiO_2$, $Cr_2O_3$, α-alumina having an α transformation rate equal to or greater than 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide.

Among these, as the non-magnetic particles, a-iron oxide is preferable.

The shape of the non-magnetic particles is not particularly limited and may be any of a needle shape, a sphere shape, a polyhedron shape, and a plate shape.

An average particle diameter of the non-magnetic particles is, for example, preferably 5 nm to 500 nm and more preferably 10 nm to 200 nm.

In a case where the average particle diameter of the non-magnetic particles is in the range described above, further excellent dispersibility of the non-magnetic particles is obtained and the surface roughness can be adjusted to more suitable surface roughness for the non-magnetic layer to be formed.

The dispersibility of the non-magnetic particles and the surface roughness of the non-magnetic layer can be suitably adjusted by combining non-magnetic particles having different average particle diameters or adjusting particle size distribution of the non-magnetic particles.

The average particle diameter of these non-magnetic particles is a value measured with a transmission electron microscope (TEM).

A BET specific surface area of the non-magnetic particles is, for example, preferably 50 $m^2/g$ to 150 $m^2/g$.

In a case where the non-magnetic layer forming composition includes non-magnetic particles, one kind or two or more kinds of the non-magnetic particles may be included.

The non-magnetic particles can be purchased as a commercially available product and can also be manufactured by a well-known method.

In a case where the non-magnetic layer forming composition includes the non-magnetic particles, a content of the non-magnetic particles in the non-magnetic layer forming composition is preferably 50% by mass to 90% by mass and more preferably 60% by mass to 90% by mass with respect to the amount of solid contents of the non-magnetic layer forming composition.

Binding Agent

The non-magnetic layer forming composition preferably includes a binding agent.

The binding agent in the non-magnetic layer forming composition is the same as the binding agent described in the section of the magnetic layer forming composition, and the preferable aspects are also the same as the preferable aspects thereof. Therefore, the description is omitted here.

Other Additives

The non-magnetic layer forming composition may include various additives (that is, other additives), if necessary, in addition to the non-magnetic particles and the binding agent described above.

The other additives in the non-magnetic layer forming composition are the same as the other additives described in the section of the magnetic layer forming composition, and the preferable aspects are also the same as the preferable aspects thereof. Therefore, the description is omitted here.

The coating amount of the non-magnetic layer forming composition is not particularly limited.

The non-magnetic layer forming composition is, for example, preferably applied so that the thickness of the non-magnetic layer after drying becomes 0.05 μm to 3.0 μm, more preferably applied so that the thickness becomes 0.05 μm to 2.0 μm, and even more preferably applied so that the thickness becomes 0.05 μm to 1.5 μm.

Back Coating Layer Forming Composition

Non-Magnetic Particles

A back coating layer forming composition preferably includes non-magnetic particles.

The non-magnetic particles in the back coating layer forming composition are the same as the non-magnetic particles described in the section of the non-magnetic layer forming composition, and the preferable aspects are also the same as the preferable aspects thereof. Therefore, the description is omitted here.

Binding Agent

The back coating layer forming composition preferably includes a binding agent.

The binding agent in the back coating layer forming composition is the same as the binding agent described in the section of the magnetic layer forming composition, and the preferable aspects are also the same as the preferable aspects thereof. Therefore, the description is omitted here.

Other Additives

The back coating layer forming composition may include various additives (that is, other additives), if necessary, in addition to the non-magnetic particles and the binding agent described above.

The other additives in the back coating layer are the same as the other additives described in the section of the magnetic layer forming composition, and the preferable aspects are also the same as the preferable aspects thereof. Therefore, the description is omitted here.

The coating amount of the back coating layer forming composition is not particularly limited.

The back coating layer forming composition is, for example, preferably applied so that the thickness of the back coating layer after drying becomes equal to or smaller than 0.9 μm, and more preferably applied so that the thickness becomes 0.1 μm to 0.7 μm.

Magnetic Recording Medium

A magnetic recording medium obtained by the manufacturing method of this disclosure at least includes a non-magnetic support, and a magnetic layer which is provided on at least one surface of the non-magnetic support and includes particles of a ε-iron oxide-based compound manufactured by the particles of β-iron oxyhydroxide-based compound of this disclosure.

The magnetic recording medium obtained by the manufacturing method of this disclosure includes the particles of the ε-iron oxide-based compound derived from the particles of β-iron oxyhydroxide-based compound of this disclosure in the magnetic layer, and accordingly, an excellent SNR and excellent film hardness of the magnetic layer are obtained.

Recording System of Magnetic Recording Medium

As a recording system of the magnetic recording medium of this disclosure, a helical scan recording system or a linear recording system may be used, and a linear recording system is preferable.

The magnetic recording medium of this disclosure has an excellent SNR and film hardness of the magnetic layer, and thus, the magnetic recording medium is suitable for recording in a linear system.

The magnetic recording medium of this disclosure is preferably used in electromagnetic wave assist recording.

In the magnetic recording medium of this disclosure, the particles of the ε-iron oxide-based compound are used as a magnetic material. The reversing of a spin of the particles of the ε-iron oxide-based compound is difficult due to extremely high coercivity. In the magnetic recording medium of this disclosure, the spin is easily reversed only in a case of performing the recording by using so-called electromagnetic wave assist recording of irradiating the particles of the ε-iron oxide-based compound included in the magnetic layer with electromagnetic waves and reversing and recording the spin by a magnetic field while causing precession, and thus, excellent recording can be realized.

EXAMPLES

Hereinafter, the invention will be described more specifically with reference to examples, but the invention is not limited to the following examples, as long as other examples are not departed from the gist thereof.

Preparation of ε-Iron Oxide-Based Compound

Preparation of Magnetic Material 1

Step (A) 8.1 g of iron (III) nitrate nonahydrate, 1.3 g of gallium (III) nitrate octahydrate, 188.0 mg of cobalt (II) nitrate hexahydrate, 150.0 mg of titanium (III) sulfate, and 1.13 g of polyvinylpyrrolidone (PVP) were added to 91.5 g of pure water and stirred by using a magnetic stirrer, to obtain an aqueous solution A including a compound including trivalent ferrous ions.

The aqueous solution A was stirred with a magnetic stirrer under the conditions of the atmosphere and a liquid temperature of 25° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 25° C. to obtain a particle dispersion liquid of an iron oxyhydroxide-based compound.

Step (B)

The centrifugal separation was performed with respect to the obtained particle dispersion liquid of the iron oxyhydroxide-based compound at 100,000 rpm for 20 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM) imaging and dried to obtain particles of an iron oxyhydroxide-based compound 1.

Step (C)

0.8 g of citric acid was added to 9.2 g of pure water to prepare a citric acid aqueous solution.

The prepared citric acid aqueous solution was added to the slurry, after extracting a part thereof, and stirred for 1 hour. After the stirring, the generated precipitate was extracted by the centrifugal separation [step (C-1)].

The extracted precipitate was washed with pure water and dried at 80° C. to obtain a dried material. Then, the obtained dried material was dispersed again in water by adding 800.0 g of pure water thereto, and a dispersion liquid was obtained [step (C-2)].

Step (D)

The obtained dispersion liquid was heated to 50° C., 39.0 g of a 25% by mass ammonia aqueous solution was added dropwise while stirring, and stirred for 1 hour while maintaining the temperature at 50° C. Next, 13.4 mL of tetraethoxysilane (TEOS) was added dropwise, and stirred for 24 hours, and then, 51.0 g of ammonium sulfate was added to obtain a dispersion liquid including a precipitate.

Step (E)

The generated precipitate was extracted by the centrifugal separation. The extracted precipitate was washed with pure water and dried at 80° C., and precursor particles of the ε-iron oxide-based compound were obtained.

Step (F)

A furnace was filled with the obtained precursor particles of the ε-iron oxide-based compound were and heat treatment was performed under atmosphere at 1,028° C. for 4 hours, thereby obtaining heat-treated particles.

Step (G)

The obtained heat-treated particles were put into a 4 mol/L sodium hydroxide (NaOH) aqueous solution and stirred at a liquid temperature of 70° C. for 24 hours, thereby removing a Si-containing coating film from the heat-treated particles. Next, the centrifugal separation was performed to recover the obtained precipitate.

Step (H)

The recovered precipitate was washed with pure water and dried at 90° C. to obtain particles of a magnetic material 1.

Preparation of Magnetic Material 2

Step (A)

A particle dispersion liquid of the iron oxyhydroxide-based compound was obtained by the same method as that in the step (A) in the preparation of the magnetic material 1.

Step (B)

The centrifugal separation was performed with respect to the obtained particle dispersion liquid of the iron oxyhydroxide-based compound at 100,000 rpm for 10 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM) imaging and dried to obtain particles of an iron oxyhydroxide-based compound 2.

Step (C) to Step (H)

Particles of a magnetic material 2 were obtained by the same method as that in step (C) to the step (H) in the preparation of the magnetic material 1.

Preparation of Magnetic Material 3

Step (A)

A particle dispersion liquid of the iron oxyhydroxide-based compound was obtained by the same method as that in the step (A) in the preparation of the magnetic material 1.

Step (B)

The centrifugal separation was performed with respect to the obtained particle dispersion liquid of the iron oxyhydroxide-based compound at 100,000 rpm for 15 minutes and a supernatant was recovered. In the centrifugal separation, a centrifugal separation device (product name: CP100WX) manufactured by Hitachi Koki Co., Ltd. was used.

A part of the recovered supernatant was collected. The collected supernatant was added dropwise with mesh for transmission electron microscope (TEM) imaging and dried to obtain particles of an iron oxyhydroxide-based compound 3.

Step (C)

0.8 g of citric acid was added to 9.2 g of pure water to prepare a citric acid aqueous solution.

The prepared citric acid aqueous solution was added to the supernatant, after recovering a part thereof, and stirred for 1 hour. After the stirring, the generated precipitate was extracted by the centrifugal separation [step (C-1)].

The extracted precipitate was washed with pure water and dried at 80° C. to obtain a dried material. Then, the obtained dried material was dispersed again in water by adding 800.0 g of pure water thereto, and a dispersion liquid was obtained [step (C-2)].

Step (D) to Step (H)

Particles of a magnetic material 3 were obtained by the same method as that in the step (D) to the step (H) in the preparation of the magnetic material 1.

Preparation of Magnetic Material 4
Step (A)

An aqueous solution A including a compound including trivalent ferrous ions was obtained by the same method as that in the step (A) in the preparation of the magnetic material 1.

The aqueous solution A was stirred with a magnetic stirrer under the conditions of the atmosphere and a liquid temperature of 6° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 6° C. to obtain a particle dispersion liquid of an iron oxyhydroxide-based compound.

Step (B)

The centrifugal separation was performed with respect to the obtained particle dispersion liquid of the iron oxyhydroxide-based compound at 100,000 rpm for 30 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM imaging and dried to obtain particles of an iron oxyhydroxide-based compound 4.

Step (C) to Step (H)

Particles of a magnetic material 4 were obtained by the same method as that in step (C) to the step (H) in the preparation of the magnetic material 1.

Preparation of Magnetic Material 5
Step (A)

An aqueous solution A including a compound including trivalent ferrous ions was obtained by the same method as that in the step (A) in the preparation of the magnetic material 1.

The aqueous solution A was stirred with a magnetic stirrer under the conditions of the atmosphere and a liquid temperature of 55° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 55° C. to obtain a particle dispersion liquid of an iron oxyhydroxide-based compound.

Step (B)

The centrifugal separation was performed with respect to the obtained particle dispersion liquid of the iron oxyhydroxide-based compound at 100,000 rpm for 5 minutes and a supernatant was recovered. The ultrasonic dispersion process was performed with respect to the recovered supernatant and the centrifugal separation was performed at 100,000 rpm for 15 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM imaging and dried to obtain particles of an iron oxyhydroxide-based compound 5.

Step (C) to Step (H)

Particles of a magnetic material 5 were obtained by the same method as that in step (C) to the step (H) in the preparation of the magnetic material 1.

Preparation of Magnetic Material 6
Step (A)

8.1 g of iron (III) nitrate nonahydrate, 3.1 g of gallium (III) nitrate octahydrate, and 1.13 g of polyvinylpyrrolidone (PVP) were added to 91.5 g of pure water and stirred by using a magnetic stirrer, to obtain an aqueous solution B including a compound including trivalent ferrous ions.

The aqueous solution B was stirred with a magnetic stirrer under the conditions of the atmosphere and a liquid temperature of 25° C. (reaction temperature), and 3.7 g of a 25% by mass ammonia aqueous solution (alkali agent) was added to into the aqueous solution B during the stirring. Then, the mixture was stirred for 2 hours while maintaining the liquid temperature at 25° C. to obtain a particle dispersion liquid of an iron oxyhydroxide-based compound.

Step (B) to Step (H)

Particles of an iron oxyhydroxide-based compound 6 and particles of a magnetic material 6 were obtained by the same method as that in step (B) to the step (H) in the preparation of the magnetic material 1.

Preparation of Magnetic Material 7
Step (A)

8.1 g of iron (III) nitrate nonahydrate, 2.1 g of gallium (III) nitrate octahydrate, 131.0 mg of cobalt (II) nitrate hexahydrate, 107.0 mg of titanium (III) sulfate, and 1.13 g of polyvinylpyrrolidone (PVP) were added to 91.5 g of pure water and stirred by using a magnetic stirrer, to obtain an aqueous solution C including a compound including trivalent ferrous ions.

The aqueous solution C was stirred with a magnetic stirrer under the conditions of the atmosphere and a liquid temperature of 25° C. (reaction temperature), and 3.7 g of a 25% by mass ammonia aqueous solution (alkali agent) was added to into the aqueous solution C during the stirring. Then, the mixture was stirred for 2 hours while maintaining the liquid temperature at 25° C. to obtain a particle dispersion liquid of an iron oxyhydroxide-based compound.

Step (B) to Step (H)

Particles of an iron oxyhydroxide-based compound 7 and particles of a magnetic material 7 were obtained by the same method as that in step (B) to the step (H) in the preparation of the magnetic material 1.

Preparation of Magnetic Material 8
Step (A)

An aqueous solution A including a compound including trivalent ferrous ions was obtained by the same method as that in the step (A) in the preparation of the magnetic material 1.

The aqueous solution A was stirred with a magnetic stirrer under the conditions of the atmosphere and a liquid temperature of 6° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 6° C. to obtain a particle dispersion liquid of an iron oxyhydroxide-based compound.

Step (B)

The step (B) in the preparation of the magnetic material 1 was not performed.

A part of the particle dispersion liquid of the iron oxyhydroxide-based compound obtained in the step (A) was collected. The collected particle dispersion liquid of the iron oxyhydroxide-based compound was added dropwise with mesh for transmission electron microscope (TEM imaging and dried to obtain particles of an iron oxyhydroxide-based compound 8.

Step (C)

0.8 g of citric acid was added to 9.2 g of pure water to prepare a citric acid aqueous solution.

The prepared citric acid aqueous solution was added to the particle dispersion liquid of the iron oxyhydroxide-based compound, after recovering a part thereof, and stirred for 1 hour. After the stirring, the generated precipitate was extracted by the centrifugal separation [step (C-1)].

The extracted precipitate was washed with pure water and dried at 80° C. to obtain a dried material. Then, the obtained dried material was dispersed again in water by adding 800.0 g of pure water thereto, and a dispersion liquid was obtained [step (C-2)].

Step (D) to Step (H)

Particles of a magnetic material 8 were obtained by the same method as that in step (D) to the step (H) in the preparation of the magnetic material 1.

Preparation of Magnetic Material 9

Step (A)

An aqueous solution A including a compound including trivalent ferrous ions was obtained by the same method as that in the step (A) in the preparation of the magnetic material 1.

The aqueous solution A was stirred with a magnetic stirrer under the conditions of the atmosphere and a liquid temperature of 55° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 55° C. to obtain a particle dispersion liquid of an iron oxyhydroxide-based compound.

Step (B)

The step (B) in the preparation of the magnetic material 1 was not performed.

A part of the particle dispersion liquid of the iron oxyhydroxide-based compound obtained in the step (A) was collected. The collected particle dispersion liquid of the iron oxyhydroxide-based compound was added dropwise with mesh for transmission electron microscope (TEM imaging and dried to obtain particles of an iron oxyhydroxide-based compound 9.

Step (C)

0.8 g of citric acid was added to 9.2 g of pure water to prepare a citric acid aqueous solution.

The prepared citric acid aqueous solution was added to the particle dispersion liquid of the iron oxyhydroxide-based compound, after recovering a part thereof, and stirred for 1 hour. After the stirring, the generated precipitate was extracted by the centrifugal separation [step (C-1)].

The extracted precipitate was washed with pure water and dried at 80° C. to obtain a dried material. Then, the obtained dried material was dispersed again in water by adding 800.0 g of pure water thereto, and a dispersion liquid was obtained [step (C-2)].

Step (D) to Step (H)

Particles of a magnetic material 9 were obtained by the same method as that in step (D) to the step (H) in the preparation of the magnetic material 1.

Preparation of Magnetic Material 10

Step (A)

An aqueous solution A including a compound including trivalent ferrous ions was obtained by the same method as that in the step (A) in the preparation of the magnetic material 1.

The aqueous solution A was stirred with a magnetic stirrer under the conditions of the atmosphere and a liquid temperature of 6° C. (reaction temperature), and 3.7 g of a 25% by mass ammonia aqueous solution (alkali agent) was added to into the aqueous solution A during the stirring. Then, the mixture was stirred for 2 hours while maintaining the liquid temperature at 6° C. to obtain a particle dispersion liquid of an iron oxyhydroxide-based compound.

Step (B)

The centrifugal separation was performed with respect to the obtained particle dispersion liquid of the iron oxyhydroxide-based compound at 100,000 rpm for 10 minutes and a supernatant was recovered. The ultrasonic dispersion process was performed with respect to the recovered supernatant and the centrifugal separation was performed at 100,000 rpm for 45 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM imaging and dried to obtain particles of an iron oxyhydroxide-based compound 10.

Step (C) to Step (H)

Particles of a magnetic material 10 were obtained by the same method as that in step (C) to the step (H) in the preparation of the magnetic material 1.

Preparation of Magnetic Material 11

Step (A)

A particle dispersion liquid of the iron oxyhydroxide-based compound was obtained by the same method as that in the step (A) in the preparation of the magnetic material 1.

Step (B)

The centrifugal separation was performed with respect to the obtained particle dispersion liquid of the iron oxyhydroxide-based compound at 80,000 rpm for 15 minutes and precipitated slurry was extracted. In the centrifugal separation, a centrifugal separation device (product name: CP100WX) manufactured by Hitachi Koki Co., Ltd. was used.

A part of the extracted slurry was collected. Pure water was added to the collected slurry, and an ultrasonic dispersion process was performed to obtain a dispersion-processed solution. The obtained dispersion-processed solution was added dropwise with mesh for transmission electron microscope (TEM imaging and dried to obtain particles of an iron oxyhydroxide-based compound 11.

Step (C) to Step (H)

Particles of a magnetic material 11 were obtained by the same method as that in step (C) to the step (H) in the preparation of the magnetic material 1.

Preparation of Magnetic Material 12

Step (A)

A particle dispersion liquid of the iron oxyhydroxide-based compound was obtained by the same method as that in the step (A) in the preparation of the magnetic material 1.

Step (B)

The centrifugal separation was performed with respect to the obtained particle dispersion liquid of the iron oxyhydroxide-based compound at 100,000 rpm for 45 minutes and a supernatant was recovered. In the centrifugal separation, a centrifugal separation device (product name: CP100WX) manufactured by Hitachi Koki Co., Ltd. was used.

A part of the recovered supernatant was collected. The collected supernatant was added dropwise with mesh for transmission electron microscope (TEM imaging and dried to obtain particles of an iron oxyhydroxide-based compound 12.

Step (C)

0.8 g of citric acid was added to 9.2 g of pure water to prepare a citric acid aqueous solution.

The prepared citric acid aqueous solution was added to the supernatant, after recovering a part thereof, and stirred for 1 hour. After the stirring, the generated precipitate was extracted by the centrifugal separation [step (C-1)].

The extracted precipitate was washed with pure water and dried at 80° C. to obtain a dried material. Then, the obtained dried material was dispersed again in water by adding 800.0 g of pure water thereto, and a dispersion liquid was obtained [step (C-2)].

Step (D) to Step (H)

Particles of a magnetic material 12 were obtained by the same method as that in the step (D) to the step (H) in the preparation of the magnetic material 1.

Preparation of Magnetic Material 13

A magnetic material 13 was obtained according to a method of Example 1 disclosed in JP5966064B.

In a reactor having capacity of 30 L (liters), 2910.27 g of iron (III) nitrate nonahydrate (purity: 99.5% by mass), 786.25 g of a gallium (III) nitrate solution (gallium concentration: 10.3% by mass), 65.76 g of cobalt (II) nitrate hexahydrate (purity: 97.0% by mass), and 69.04 g of titanium (IV) sulfate (titanium concentration: 15.2% by mass) were dissolved in 31368.68g of pure water while mechanically stirring with a stirring blade under the conditions of the atmosphere and a liquid temperature of 40° C., and a charge solution was obtained. A molar ratio of metal ions in the charge solution is Fe:Ga:Co:Ti=1.635:0.265:0.050:0.050.

The charge solution was mechanically stirred with a stirring blade under the conditions of the atmosphere and a liquid temperature of 40° C., and 1595.91 g of an ammonia aqueous solution having a concentration of 22.09% by mass was added at once into the charge solution during the stirring. Then, the stirring was performed for 2 hours while maintaining the liquid temperature at 40° C. The solution was cloudy brown liquid in the initial stage of the addition of ammonia aqueous solution, but this was changed to a clear brown liquid after 2 hours, and pH thereof was 1.67.

Then, 1684.38 g of a citric acid aqueous solution having concentration of 10% by mass was continuously added under the condition of 40° C. for 1 hour, 2,000 g of an ammonia aqueous solution having concentration of 10% by mass was added at once to set pH as 8.51. Then, the stirring was performed for 1 hour while maintaining the liquid temperature at 40° C., and generated slurry was recovered. A molar ratio of citric acid with respect to the amount of trivalent ferrous ions was 0.122.

The recovered slurry was washed until electrical conductivity of filtrate becomes equal to or smaller than 50 mS/m by using ultrafiltration membrane (cutoff molecular weight: 50,000). The conductivity of the washed slurry was 105 mS/m.

A part of the washed slurry was collected. Pure water was added to the collected slurry, and an ultrasonic dispersion process was performed to obtain a dispersion-processed solution. The obtained dispersion-processed solution was added dropwise with mesh for transmission electron microscope (TEM imaging and dried to obtain particles of an iron oxyhydroxide-based compound 13.

3162.89 g of the washed slurry (including 60 g of ε-iron oxide-based compound) was fractionated in a reactor having capacity of 5 L, pure water was added so that the liquid amount becomes 4,000 mL, and a dilute solution of the slurry was obtained. Then, the dilute solution of the slurry was stirred under the conditions of the atmosphere and the liquid temperature of 30° C., 212.46 g of an ammonia aqueous solution having a concentration of 22.09% by mass was added to the dilute solution of the slurry during the stirring, and 428.95 g of tetraethoxy silane (TEOS) was added for 35 minutes. After the addition, the stirring was continued approximately for a day. Then, a solution obtained by dissolving 202.6 g of ammonium sulfate to 300 g of pure water was added, the obtained solution was washed and subjected to solid-liquid separation, and a precipitate which is a solid content was recovered. The recovered precipitate is a precursor of ε-iron oxide-based compound and is coated with the Si-containing coating film generated by hydrolysis of TEOS.

After drying the obtained precipitate, a furnace was filled with the precipitate and subjected to heat treatment under the atmosphere at 1066° C. to 1079° C. for 4 hours, and heat-treated particles were obtained.

The obtained heat-treated particles were put into a sodium hydroxide (NaOH) aqueous solution having concentration of 20% by mass and stirred at a liquid temperature of approximately 70° C. for 24 hours, thereby removing the Si-containing coating film from the heat-treated particles. Then, the washing was performed with pure water until conductivity of the washed slurry becomes 1.476 mS/m by using ultrafiltration membrane (cutoff molecular weight: 50,000), and then the drying was performed to obtain particles of a magnetic material 13.

Measurement and Structure Confirmation

1. Crystal Structure (1) Crystal Structure of Iron Oxyhydroxide-Based Compound

The crystal structures of the iron oxyhydroxide-based compounds 1 to 13 were confirmed by the X-ray diffraction (XRD) method. As a measurement device, a diffractometer, X'Pert Pro manufactured by PANalytical was used. The measurement conditions are shown below.

Measurement Conditions

X-ray source: Cu Kα ray [wavelength of 1.54 Å (0.154 nm), output: 40 mA, 45 kV]

Scanned range: $20<2\theta<70°$

Scan interval: 0.05°

Scan speed: 0.75°/min

As a result, it was confirmed that all of the iron oxyhydroxide-based compounds 1 to 13 have the β type crystal structure. In addition, it was confirmed that all of the iron oxyhydroxide-based compounds 1 to 13 are single-phase β-iron oxyhydroxide-based compounds not having α type, γ type, and δ type crystal structures.

(2) Crystal Structure of Magnetic Material

The crystal structures of the magnetic materials 1 to 13 were confirmed by the X-ray diffraction (XRD) method. The measurement device and the measurement conditions are the same as the measurement device and the measurement conditions in the "(1) Crystal Structure of Iron Oxyhydroxide-Based Compound" described above.

As a result, it was confirmed that all of the magnetic materials 1 to 13 have the ε type crystal structure. In addition, it was confirmed that all of the magnetic materials 1 to 13 are single-phase a ε-iron oxide-based compounds not having α type, γ type, and δ type crystal structures.

2. Composition (1) Composition of Iron Oxyhydroxide-Based Compound

The compositions of the iron oxyhydroxide-based compounds 1 to 13 were confirmed by a high-frequency inductively coupled plasma (ICP) emission spectral analysis method. As a measurement device, ICPS-8100 (product name) manufactured by Shimadzu Corporation was used.

Specifically, a vessel containing 12 mg of the iron oxyhydroxide-based compound and 10 mL of a hydrochloric acid aqueous solution having a concentration of 4 mol/L was held on a hot plate at a set temperature of 80° C. for 3 hours, and a solution was obtained. After adding 30 mL of pure water to the obtained solution, the mixture was filtered by using a membrane filter having a hole diameter of 0.1 μm, and a filtrate was obtained. The obtained filtrate was subjected to element analysis by using the measurement device.

A content of each metal atom with respect to 100 atom % of iron atoms was obtained based on the obtained result of the element analysis. The composition of the iron oxyhydroxide-based compound was confirmed based on the obtained content. The composition of each iron oxyhydroxide-based compound is shown below.

· Iron Oxyhydroxide-Based Compounds 1 to 5 and 8 to 12

$\beta\text{-}Ga_{(0.125)}Co_{(0.025)}Ti_{(0.025)}Fe_{(0.825)}OOH$

[β-iron oxyhydroxide-based compound represented by Formula (6)]

· Iron Oxyhydroxide-Based Compound 6

$\beta\text{-}Ga_{(0.30)}Fe_{(0.70)}OOH$

[β-iron oxyhydroxide-based compound represented by Formula (2)]

· Iron Oxyhydroxide-Based Compound 7

$\beta\text{-}Ga_{(0.20)}Co_{(0.0125)}Ti_{(0.0125)}Fe_{(0.775)}OOH$

[β-iron oxyhydroxide-based compound represented by Formula (6)]

· Iron Oxyhydroxide-Based Compound 13

$\beta\text{-}Ga_{(0.1325)}Co_{(0.025)}Ti_{(0.025)}Fe_{(0.8175)}OOH$

[β-iron oxyhydroxide-based compound represented by Formula (6)]

(2) Composition of Magnetic Material

The compositions of the magnetic materials 1 to 13 were confirmed by a high-frequency inductively coupled plasma (ICP) emission spectral analysis method. The measurement device and the measurement method are the same as the measurement device and the measurement method in the "(1) Composition of Iron Oxyhydroxide-Based Compound" described above.

A content of each metal atom with respect to 100 atom% of iron atoms was obtained based on the obtained result of the element analysis. The composition of the magnetic material was confirmed based on the obtained content. The composition of each magnetic material is shown below.

· Magnetic Materials 1 to 5 and 8 to 12

$\varepsilon\text{-}Ga_{(0.25)}Co_{(0.05)}Ti_{(0.05)}Fe_{(1.65)}O_3$

[ε-iron oxide-based compound represented by Formula (6-1)]

· Magnetic Material 6

$\varepsilon\text{-}Ga_{(0.605)}Fe_{(1.395)}O_3$

[ε-iron oxide-based compound represented by Formula (2-1)]

· Magnetic Material 7

$\varepsilon\text{-}Ga_{(0.399)}Co_{(0.026)}Ti_{(0.025)}Fe_{(1.550)}O_3$

[ε-iron oxide-based compound represented by Formula (6-1)]

· Magnetic Material 13

$\varepsilon\text{-}Ga_{(0.265)}Co_{(0.050)}Ti_{(0.050)}Fe_{(1.635)}O_3$

[ε-iron oxide-based compound represented by Formula (6-1)]

3. Shape (1) Shape of Particles of Iron Oxyhydroxide-Based Compound

The shape of the particles of the iron oxyhydroxide-based compounds 1 to 13 was confirmed by observation with a transmission electron microscope (TEM) and all of the particles of the iron oxyhydroxide-based compounds had a sphere shape.

(2) Shape of Particles of magnetic Material

The shape of the particles of the magnetic materials 1 to 13 was confirmed by observation with a transmission electron microscope (TEM) and all of the particles of the magnetic materials had a sphere shape.

4. Average Equivalent Circle Diameter (1) Average Equivalent Circle Diameter and Coefficient of Variation of Equivalent Circle Diameters of Particles of Iron Oxyhydroxide-Based Compound The average equivalent circle diameters of the particles of the iron oxyhydroxide-based compounds 1 to 13 were obtained by the following method. The result is shown in Table 1.

The particles of the iron oxyhydroxide-based compound were imaged with a transmission electron microscope (TEM) (model number: H-9000, manufactured by Hitachi, Ltd.) at an imaging magnification ratio of 80,000 and printed on photographic printing paper so that the total magnification ratio becomes 500,000. The primary particle was selected from the printed particles and an outline of the primary particle was traced with a digitizer. A diameter (equivalent circle area diameter) of a circle having the same area as the traced region was obtained by using image analysis software KS-400 manufactured by Carl Zeiss as the image analysis software.

The equivalent circle area diameters of 500 particles which were randomly extracted from the primary particles printed on the plurality of photographic printing paper were calculated. By performing simple averaging (that is, number averaging) of the obtained equivalent circle area diameters of 500 particles, an average equivalent circle diameter of the primary particles was obtained.

In a case where the presence of the secondary particle was confirmed, the equivalent circle area diameters of 200 particles which were randomly extracted from the secondary particles printed on the plurality of photographic printing paper were also calculated. By performing simple averaging (that is, number averaging) of the obtained equivalent circle area diameters of 200 particles, an average equivalent circle diameter of the secondary particles was obtained. The secondary particles are aggregated particles (so-called aggregate) as described above.

The coefficient of variation of equivalent circle diameters (unit: %) was obtained by dividing a standard deviation of the equivalent circle diameters of the particles obtained as described above by the average equivalent circle diameter and multiplying by 100. The result is shown in Table 1.

(2) Average Equivalent Circle Diameter of Particles of Magnetic Material

The average equivalent circle diameters of the particles of the magnetic materials 1 to 13 were obtained by the same method as in the "(1) Average Equivalent Circle Diameter of Particles of Iron Oxyhydroxide-Based Compound" described above. The result is shown below.

Magnetic material 1: 13.3 nm, magnetic material 2: 28.6 nm, magnetic material 3: 7.7 nm, magnetic material 4: 7.2 nm, magnetic material 5: 32.4 nm, magnetic material 6: 13.1 nm, magnetic material 7: 12.9 nm, magnetic material 8: 6.9 nm, magnetic material 9: 31.4 nm, magnetic material 10: 7.1 nm, magnetic material 11: 34.1 nm, magnetic material 12: 6.5 nm, magnetic material 13: 8.8 nm Preparation of Magnetic Recording Medium (Magnetic Tape)

Examples 1 to 7 and Comparative Examples 1 to 6

1. Preparation of Magnetic Layer Forming Composition

The magnetic layer forming composition having the composition shown below was prepared by the following method.

First, each component of the magnetic liquid having the composition shown below was beads-dispersed by using a batch type vertical sand mill for 24 hours and a magnetic liquid was prepared. In this beads dispersion, zirconia beads having a diameter of 0.5 mm were used. The amount of zirconia beads which was 15 times that of the particles of the magnetic material based on mass was used.

Then, each component of the abrasive solution having the composition shown below was dispersed by using a batch type ultrasonic device (process conditions: 20 kHz, 300 W) for 24 hours, and the abrasive solution was prepared.

Next, after mixing the magnetic liquid and the abrasive solution prepared as described above, and other components shown below (non-magnetic filler solution, lubricant, curing agent, finishing additive solvent) to each other, the dispersion process was performed with respect to the obtained mixture by using a batch type ultrasonic device (process conditions: 20 kHz, 300 W) for 30 minutes. After this dispersion process, a magnetic layer forming composition was prepared by filtering with a filter having an average hole diameter of 0.5 μm.

Composition of Magnetic Layer Forming Composition

Magnetic Liquid

Magnetic material: 100.0 parts by mass (Magnetic materials 1 to 13 prepared as described above)

$SO_3Na$ group-containing polyurethane resin: 14.0 parts by mass (Weight-average molecular weight: 70,000, $SO_3Na$ group: 0.4 meq/g)

Cyclohexanone: 150.0 parts by mass

Methyl ethyl ketone: 150.0 parts by mass

Abrasive Solution

Abrasive solution A

Alumina abrasive: 3.0 parts by mass (Average particle diameter: 100 nm)

$SO_3Na$ group-containing polyurethane resin: 0.3 parts by mass (Weight-average molecular weight: 70,000, $SO_3Na$ group: 0.3 meq/g)

Cyclohexanone: 26.7 parts by mass

Abrasive solution B

Diamond abrasive: 1.0 part by mass (Average particle diameter: 100 nm)

$SO_3Na$ group-containing polyurethane resin: 0.1 parts by mass (Weight-average molecular weight: 70,000, $SO_3Na$ group: 0.3 meq/g)

Cyclohexanone: 26.7 parts by mass

Non-Magnetic Filler Solution

Colloidal silica: 0.2 parts by mass (Average particle diameter: 100 nm)

Methyl ethyl ketone: 1.4 parts by mass

Lubricant

Stearic acid: 2.0 parts by mass

Butyl stearate: 6.0 parts by mass

Curing Agent

Polyisocyanate: 2.5 parts by mass (Product name: CORONATE (registered trademark) L, manufactured by Tosoh Corporation)

Finishing additive solvent

Cyclohexanone: 200.0 parts by mass

Methyl ethyl ketone: 200.0 parts by mass

2. Preparation of Non-Magnetic Layer Forming Composition

The non-magnetic layer forming composition having the composition shown below was prepared by the following method.

First, each component of the non-magnetic layer forming composition having the composition shown below was beads-dispersed by using a batch type vertical sand mill for 24 hours. In this beads dispersion, zirconia beads having a diameter of 0.1 mm were used. Then, by filtering using a filter having an average hole diameter of 0.5 μm, a non-magnetic layer forming composition was prepared.

Composition of Non-Magnetic Layer Forming Composition

Non-magnetic inorganic particles; α-iron oxide: 100.0 parts by mass (Average particle diameter (average long axis length): 10 nm, average acicular ratio: 1.9, BET specific surface area: 75 m$^2$/g)

Carbon black: 25.0 parts by mass (Average particle diameter: 20 nm)

$SO_3Na$ group-containing polyurethane resin: 18.0 parts by mass (Weight-average molecular weight: 70,000, $SO_3Na$ group: 0.2 meq/g)

Stearic acid (lubricant): 1.0 part by mass

Cyclohexanone: 300.0 parts by mass

Methyl ethyl ketone: 300.0 parts by mass

3. Preparation of Back Coating Layer Forming Composition

The back coating layer forming composition having the composition shown below was prepared by the following method.

First, among the components of the back coating layer forming composition having the composition shown below, the components excluding stearic acid and butyl stearate which are a lubricant, polyisocyanate which is a curing agent, and cyclohexanone (A) were kneaded by an open kneader and diluted. In the dilution, a mixed solvent of methyl ethyl ketone and cyclohexanone was used.

Then, the kneaded material obtained by the kneading and the dilution was subjected to a dispersion process of 12 passes by setting a retention time for 1 pass as 2 minutes with a transverse beads mill dispersion device and zirconia beads having a diameter of 1 mm, under the conditions of a bead filling percentage of 80 volume %, a circumferential speed of rotor distal end of 10 m/sec, and a first dispersion liquid was obtained.

Next, the remaining components (that is, stearic acid and butyl stearate which are a lubricant, polyisocyanate which is a curing agent, and cyclohexanone (A)) were added into the obtained first dispersion liquid and stirred with a dissolver stirrer, to obtain a second dispersion liquid.

Then, the obtained second dispersion liquid was filtered with a filter having an average hole diameter of 1.0 μm and a back coating layer forming composition was prepared.

Composition of back Coating Layer Forming Composition

Non-magnetic inorganic particles; a-iron oxide: 80.0 parts by mass (Average particle diameter (average long axis length): 0.15 μm, average acicular ratio: 7, BET specific surface area: 52 m$^2$/g)

Carbon black: 20.0 parts by mass (Average particle diameter: 20 nm)

A vinyl chloride copolymer: 13.0 parts by mass (Product name: MR-104, manufactured by Zeon Corporation)

SO$_3$Na group-containing polyurethane resin: 6.0 parts by mass (Weight-average molecular weight: 50,000, SO$_3$Na group: 0.07 meq/g)

Phenylphosphonic acid: 3.0 parts by mass

Cyclohexanone (for dilution): 155.0 parts by mass

Methyl ethyl ketone (for dilution): 155.0 parts by mass

Stearic acid (lubricant): 3.0 parts by mass

Butyl stearate (lubricant): 3.0 parts by mass

Polyisocyanate (curing agent): 5.0 parts by mass (Product name: CORONATE (registered trademark) 3041 manufactured by Tosoh Corporation)

Cyclohexanone (A): 200.0 parts by mass

4. Manufacturing of Magnetic Tape

The non-magnetic layer forming composition was applied onto a polyethylene naphthalate support (that is, non-magnetic support) having a thickness of 5.0 μm so that the thickness after drying becomes 100 nm, and dried, to form a non-magnetic layer.

Then, the magnetic layer forming composition was applied onto the formed non-magnetic layer so that the thickness after drying becomes 70 nm to form a coating layer. While the formed coating layer is wet, a homeotropic alignment process was performed by applying a magnetic field having magnetic field strength of 0.6 T in a vertical direction to the surface of the coating layer by using electromagnet disposed to oppose, the coating layer was dried, and a magnetic layer was formed.

Then, the back coating layer forming composition was applied onto the surface of the non-magnetic support on a side opposite to the surface where the non-magnetic layer and the magnetic layer are formed so that the thickness after drying becomes 0.4 μm, and dried to form a back coating layer, and a laminate having a layer configuration of back coating layer/non-magnetic support/non-magnetic layer/magnetic layer was obtained.

Next, the surface smoothing treatment (so-called calender process) was performed with respect to the obtained laminate with a pair of calender rolls configured of only the metal roll, at a calender process speed of 100 m/min, linear pressure of 300 kg/cm (294 kN/m), and a surface temperature of a calender roll of 100° C., and heat treatment was performed in an environment of an atmosphere temperature of 70° C. for 36 hours. After the heat treatment, the laminate was slit to have a width of ½ inches (0.0127 meters), and a magnetic tape was manufactured.

Evaluation

The following evaluations were performed with respect to the magnetic tapes of Examples 1 to 7 and Comparative Examples 1 to 6 manufactured as described above. In the evaluation, a magnetic tape cut to have a length of 50 m was used. The evaluation result is shown in Table 1.

1. Evaluation of Signal to Noise Ratio (SNR)

The magnetic tape was caused to run under the following running conditions, a magnetic signal was recorded in a longitudinal direction of the magnetic tape and reproduced by a magnetic head under the following recording and reproducing conditions. A magnetoresistive (MR) head was used as the magnetic head.

Running Conditions

Transportation speed (head/tape relative speed): 12.0 m/sec

Length per 1 pass: 1,000 m

Number of times of running: 1,000 pass reciprocating

Recording and Reproducing Conditions

Recording

Recording track width: 5.0 μm

Recording gap: 0.17 μm

Saturated magnetic flux density (Bs) of head: 1.8 T

Reproducing

Reproducing track width: 0.4 μm

Distance between shields (sh) (sh-sh distance): 0.08 μm

Linear recording density: 300 kfci (fci: flux change per inch; the same applies hereinafter)

A reproduction signal was frequency-analyzed with a spectrum analyzer manufactured by Shibasoku Co., Ltd. and a ratio of the output of 300 kfci and noise accumulated in a range of 0 kfci to 600 kfci was set as the SNR. In a case of obtaining the SNR, a sufficiently stabilized signal was used after starting the running of the magnetic tape.

Here, the evaluation was performed based on a difference between the SNR and an SNR set using the SNR of the magnetic tape of Comparative Example 1 as a reference. The evaluation standard is shown below.

In the following evaluation standard, a level in which the SNR of the magnetic tape is most excellent is "5", and it was determined that the SNR is in a practically acceptable range, in a case of the level "5", "4", or "3".

Evaluation Standard

5: SNR is equal to or greater than +1.0 dB with respect to that of the magnetic tape of Comparative Example 1.

4: SNR is equal to or greater than +0.75 dB and smaller than +1.0 dB with respect to that of the magnetic tape of Comparative Example 1.

3: SNR is equal to or greater than +0.5 dB and smaller than +0.75 dB with respect to that of the magnetic tape of Comparative Example 1.

2: SNR is equal to or greater than −0.5 dB and smaller than +0.5 dB with respect to that of the magnetic tape of Comparative Example 1.

1: SNR is smaller than −0.5 dB with respect to that of the magnetic tape of Comparative Example 1.

2. Film Hardness

The magnetic tape was caused to run under the following running conditions. After the running, a surface state of the magnetic layer was observed with an optical microscope (product name: EclipseLV150 manufactured by Nikon Corporation) at magnification ratio of 100 times, and the film hardness of the magnetic tape was evaluated according to the following evaluation standard.

In the following evaluation standard, a level in which the film hardness of the magnetic tape is most excellent is "5", and it was determined that the film hardness is in a practically acceptable range, in a case of the level "5", "4", or "3".

Running Conditions

Transportation speed (head/tape relative speed): 3.0 m/sec

Length per 1 pass: 1,000 m

Number of times of running: 1,000 pass reciprocating

Evaluation Standard

5: Sliding mark was not observed on the surface of the magnetic layer.

4: Slight sliding mark is observed on the surface of the magnetic layer, but has not been developed into chipping of the surface of the magnetic layer.

3: Surface of the magnetic layer is slightly chipped off, but there are no practical problems.

2: Surface of the magnetic layer is obviously chipped off, there are a large number of positions where the surface of the magnetic layer is peeled off or the magnetic layer was scraped, which are a practical problem.

1: The entire surface of the magnetic layer is scraped and there is a practical problem.

TABLE 1

| | | | Particles of β-iron oxyhydroxide-based compound | | | | | |
|---|---|---|---|---|---|---|---|---|
| | | | Primary particles | | Secondary particles | | | |
| | Magnetic material No. | No. | average equivalent circle diameter (nm) | coefficient of variation of equivalent circle diameters (%) | average equivalent circle diameter (nm) | coefficient of variation of equivalent circle diameters (%) | Evaluation result | |
| | | | | | | | SNR | Film hardness |
| Example 1 | 1 | 1 | 11.2 | 12.4 | — | — | 4 | 4 |
| Example 2 | 2 | 2 | 27.6 | 29.7 | — | — | 3 | 5 |
| Example 3 | 3 | 3 | 5.6 | 18.7 | — | — | 4 | 3 |
| Example 4 | 4 | 4 | 5.4 | 29.6 | — | — | 3 | 4 |
| Example 5 | 5 | 5 | 29.7 | 11.6 | — | — | 3 | 4 |
| Example 6 | 6 | 6 | 12.2 | 14.5 | — | — | 4 | 4 |
| Example 7 | 7 | 7 | 11.8 | 13.7 | — | — | 4 | 4 |
| Comparative Example 1 | 8 | 8 | 5.5 | 31.3 | — | — | 2 | 2 |
| Comparative Example 2 | 9 | 9 | 28.8 | 32.4 | — | — | 2 | 2 |
| Comparative Example 3 | 10 | 10 | 5.7 | 9.7 | 37.0 | 40.0 | 1 | 2 |
| Comparative Example 4 | 11 | 11 | 31.2 | 36.5 | — | — | 2 | 3 |
| Comparative Example 5 | 12 | 12 | 4.2 | 17.4 | — | — | 2 | 2 |
| Comparative Example 6 | 13 | 13 | 7.4 | 35.1 | — | — | 2 | 2 |

In Table 1, "—" in the column of the secondary particles means that the secondary particles were not observed in an observation visual field of a transmission electron microscope (TEM).

As shown in Table 1, in the magnetic tapes of Examples 1 to 7, all of SNRs were excellent and film hardness of the magnetic layer was excellent.

On the other hand, in the magnetic tapes of Comparative Examples 1 to 6, at least one of the SNR or the film hardness of the magnetic layer was deteriorated compared to that of the magnetic tape of the examples.

From these results, according to the particles of the β-iron oxyhydroxide-based compound of this disclosure which represented by Formula (1) and in which an average equivalent circle diameter of primary particles is 5 nm to 30 nm, and a coefficient of variation of equivalent circle diameters of the primary particles is 10% to 30%, it was confirmed that it is possible to form magnetic particles (that is, particles of ε-iron oxide-based compound) capable of manufacturing a magnetic recording medium having an excellent SNR and excellent film hardness of a magnetic layer.

What is claimed is:

1. A particle of a β-iron oxyhydroxide-based compound represented by Formula (1),
   wherein an average equivalent circle diameter of primary particles is 5 nm to 30 nm, and
   a coefficient of variation of equivalent circle diameters of the primary particles is 10% to 30%, $$\beta\text{-}A_a Fe_{1-a}OOH \quad (1)$$

in Formula (1), A represents at least one kind of metal element other than Fe, and a represents a number that satisfies a relationship of $0 \leq a < 1$.

2. The particle of a β-iron oxyhydroxide-based compound according to claim 1,
   wherein A in Formula (1) is at least one kind of metal element selected from the group consisting of Ga, Co, and Ti, and a represents a number that satisfies a relationship of $0 < a < 1$.

3. The particle of a β-iron oxyhydroxide-based compound according to claim 1,
   wherein the average equivalent circle diameter of the primary particles is 7 nm to 15 nm, and
   the coefficient of variation of equivalent circle diameters of the primary particles is 10% to 20%.

4. The particle of a β-iron oxyhydroxide-based compound according to claim 1 which is used in formation of magnetic particles.

5. The particle of a β-iron oxyhydroxide-based compound according to claim 1, wherein the average equivalent circle diameter of the primary particles is in a range of from 5.4 nm to 12.2 nm.

6. The particle of a β-iron oxyhydroxide-based compound according to claim 1, wherein the compound represented by Formula (1) is a compound represented by Formula (6) below:

$$\beta\text{-}X_x Y_y Z_z Fe_{1-x-y-z}OOH \quad (6)$$

wherein, in Formula (6): X represents at least one kind of divalent metal element selected from the group consisting of Co, Ni, Mn, and Zn; Y represents at least one kind of tetravalent metal element selected from Ti or Sn; Z represents at least one kind of trivalent metal element selected from the group consisting of Ga, Al, and In; x represents a number that satisfies a relationship of $0 < x < 0.5$; y represents a number that satisfies a relationship of 0<y<0.5; z represents a number that satisfies a relationship of 0<z<0.5; and x+y+z<1.

7. The particle of a β-iron oxyhydroxide-based compound according to claim 6, wherein, in Formula (6): X is Co; Y is Ti; and Z is Ga.

8. A manufacturing method of particles of a β-iron oxyhydroxide-based compound, the method comprising:
adding an alkali agent to an aqueous solution including a compound including trivalent ferrous ions to obtain a particle dispersion liquid of a β-iron oxyhydroxide-based compound represented by Formula (1); and
extracting particles of the β-iron oxyhydroxide-based compound represented by Formula (1), in which an average equivalent circle diameter of primary particles is 5 nm to 30 nm, and a coefficient of variation of equivalent circle diameters of the primary particles is 10% to 30%, from the particle dispersion liquid by classification means, $$\beta\text{-}A_a Fe_{1-a} OOH \quad (1)$$

in Formula (1), A represents at least one kind of metal element other than Fe and a represents a number that satisfies a relationship of 0≤a<1.

9. A manufacturing method of particles of a ε-iron oxide-based compound, the method comprising:
adding a silane compound including a hydrolyzable group to a dispersion liquid of the particles of a β-iron oxyhydroxide-based compound according to claim 1 to obtain a precursor particle dispersion liquid;
extracting precursor particles from the precursor particle dispersion liquid;
performing heat treatment with respect to the precursor particles at a temperature of 800° C. to 1,400° C. to obtain heat-treated particles; and
adding the heat-treated particles to an alkali aqueous solution.

10. A manufacturing method of a magnetic recording medium, the method comprising:
preparing a magnetic layer forming composition using particles of a ε-iron oxide-based compound obtained by the manufacturing method according to claim 6;
applying the magnetic layer forming composition onto a non-magnetic support to form a magnetic layer forming composition layer;
performing an alignment in magnetic field with respect to the formed magnetic layer forming composition layer; and
drying the magnetic layer forming composition layer subjected to the alignment in magnetic field to form a magnetic layer.

* * * * *